(12) United States Patent
Hara et al.

(10) Patent No.: US 11,289,217 B2
(45) Date of Patent: Mar. 29, 2022

(54) INTERCOOLER FOR NUCLEAR FACILITY

(71) Applicant: MITSUBISHI HEAVY INDUSTRIES, LTD., Tokyo (JP)

(72) Inventors: Nobuhide Hara, Tokyo (JP); Koichi Tanimoto, Tokyo (JP); Fumikazu Ogata, Tokyo (JP); Masahiro Yoshioka, Tokyo (JP); Ryo Morita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 551 days.

(21) Appl. No.: 16/393,286

(22) Filed: Apr. 24, 2019

(65) Prior Publication Data

US 2020/0075184 A1 Mar. 5, 2020

Related U.S. Application Data

(62) Division of application No. 14/914,131, filed as application No. PCT/JP2014/071344 on Aug. 12, 2014, now Pat. No. 10,319,482.

(30) Foreign Application Priority Data

Aug. 28, 2013 (JP) .................................. 2013-177308
Jan. 24, 2014 (JP) .................................. 2014-011758

(51) Int. Cl.
G21C 15/18 (2006.01)
G21C 15/22 (2006.01)
(Continued)

(52) U.S. Cl.
CPC ................ G21C 15/18 (2013.01); F28B 1/06 (2013.01); F28D 1/024 (2013.01); F28D 1/0443 (2013.01);
(Continued)

(58) Field of Classification Search
CPC ....... G21C 15/22; F28D 1/024; F28D 1/0246; F28D 1/04; F28D 1/05316;
(Continued)

(56) References Cited

U.S. PATENT DOCUMENTS

| 5,406,805 A | 4/1995 | Radermacher et al. |
| 5,657,360 A | 8/1997 | Muta et al. |
| (Continued) | | |

FOREIGN PATENT DOCUMENTS

| EP | 2031334 A1 | 3/2009 |
| JP | 48-63354 U | 8/1973 |
| (Continued) | | |

OTHER PUBLICATIONS

International Search Report dated Nov. 18, 2014, issued in counterpart International Application No. PCT/JP2014/071344 (2 pages).

(Continued)

*Primary Examiner* — Jack W Keith
*Assistant Examiner* — Jinney Kil
(74) *Attorney, Agent, or Firm* — Westerman, Hattori, Daniels & Adrian, LLP

(57) ABSTRACT

A plurality of heat transfer pipes; a first header and a second header to which both ends of each of the heat transfer pipes that are disposed in parallel are fixed, respectively; a plurality of plate-shaped fins through which each of the heat transfer pipes is penetrated and that are provided at intervals in a direction in which the heat transfer pipes extend between the first header and the second header; and a fan that circulates an airflow between the plate-shaped fins are included. The first header and the second header are formed to be sectioned into multiple rows, the heat transfer pipes are disposed densely in an sectioned area of the first header and the second header, and the heat transfer pipes are disposed sparsely in an area between the sectioned areas of the first header and the second header.

1 Claim, 17 Drawing Sheets

(51) Int. Cl.
*F28F 9/02* (2006.01)
*F28F 9/22* (2006.01)
*F28F 1/32* (2006.01)
*G21D 1/00* (2006.01)
*F28B 1/06* (2006.01)
*F28D 1/04* (2006.01)
*F28D 1/053* (2006.01)
*F28D 1/02* (2006.01)
*F28D 21/00* (2006.01)

(52) U.S. Cl.
CPC ............ *F28D 1/05341* (2013.01); *F28F 1/32* (2013.01); *F28F 9/02* (2013.01); *F28F 9/0204* (2013.01); *F28F 9/22* (2013.01); *G21C 15/22* (2013.01); *G21D 1/00* (2013.01); *F28D 2021/0054* (2013.01); *F28F 2250/08* (2013.01); *Y02E 30/30* (2013.01)

(58) Field of Classification Search
CPC .............. F28D 1/05333; F28D 1/05341; F28F 9/0204; F28F 9/0209
USPC ........................................................ 376/298
See application file for complete search history.

(56) References Cited

U.S. PATENT DOCUMENTS

| | | |
|---|---|---|
| 2003/0019620 A1 | 1/2003 | Pineo et al. |
| 2006/0054310 A1 | 3/2006 | Kim et al. |
| 2009/0025409 A1 | 1/2009 | Kopko et al. |
| 2011/0303396 A1 | 12/2011 | Ishida et al. |
| 2012/0011867 A1 | 1/2012 | Koons et al. |
| 2012/0067546 A1 | 3/2012 | Bugler, III et al. |
| 2012/0213322 A1 | 8/2012 | Naito et al. |

FOREIGN PATENT DOCUMENTS

| | | |
|---|---|---|
| JP | 50-98366 U | 8/1975 |
| JP | 55-166370 U | 11/1980 |
| JP | 61-162774 U | 10/1986 |
| JP | 62-201324 U | 12/1987 |
| JP | 63-3188 A | 1/1988 |
| JP | 4-313686 A | 11/1992 |
| JP | 07-158902 A | 6/1995 |
| JP | 8-146184 A | 6/1996 |
| JP | 10-246473 A | 9/1998 |
| JP | 2000-180090 A | 6/2000 |
| JP | 2000-230795 A | 8/2000 |
| JP | 2002-206890 A | 7/2002 |
| JP | 2002-243383 A | 8/2002 |
| JP | 2003-262485 A | 9/2003 |
| JP | 2003-275836 A | 9/2003 |
| JP | 2003-343881 A | 12/2003 |
| JP | 2004-198041 A | 7/2004 |
| JP | 2004-332973 A | 11/2004 |
| JP | 2005-226878 A | 8/2005 |
| JP | 2007-322060 A | 12/2007 |
| JP | 2007-327736 A | 12/2007 |
| JP | 2008-128562 A | 6/2008 |
| JP | 2009-74739 A | 4/2009 |
| JP | 2010-216798 A | 9/2010 |
| JP | 2010-256322 A | 11/2010 |
| JP | 2011-149593 A | 8/2011 |
| JP | 2011-163670 A | 8/2011 |
| JP | 2012-052747 A | 3/2012 |
| JP | 2012-229901 A | 11/2012 |
| JP | 2013-57559 A | 3/2013 |
| JP | 2013-160445 A | 8/2013 |

OTHER PUBLICATIONS

Written Opinion of the International Searching Authority dated Nov. 18, 2014, issued in counterpart International Application No. PCT/JP2014/071344 (6 pages).
English translation of Written Opinion of the International Searching Authorty dated Nov. 18, 2014, issued in counterpart International Application No. PCT/JP2014/071344 (9 pages).
Office Action dated Jun. 6, 2017, issued in Japan Patent Application No. 2014-011758 with English translation (15 pages).
Office Action dated Sep. 5, 2017, issued in counterpart Japanese Application No. 2014-011758, with English translation. (12 pages).
Non-Final Office Action dated Sep. 7, 2021, issued in U.S. Appl. No. 16/393,382. (14 pages).

INTERCOOLER FOR NUCLEAR FACILITY

CROSS-REFERENCE TO RELATED APPLICATION

This application is a divisional application of and claims the priority benefit of U.S. application Ser. No. 14/914,131, filed on Jun. 24, 2016, now allowed. The entirety of the above-mentioned patent application is hereby incorporated by reference herein.

FIELD

The present invention relates to an air cooler that cools heat transfer pipes through which a medium circulates by using an airflow and to an intercooler and a nuclear facility to which the air cooler is used.

BACKGROUND

Conventionally, for example, the air cooler (fin tube type heat exchanger) according to Patent Document 1 consists of a large number of plate-shaped fins that are arranged in parallel at predetermined intervals and between which an airflow flows and heat transfer pipes that are perpendicularly inserted into the plate-shaped fins and in which a fluid flows. In the air cooler according to Patent Document 1, in order to improve the heat transfer coefficient by reducing the dead water areas that are caused in airflow backward areas with respect to the heat transfer pipes, the pitch L1 between heat transfer pipes in the airflow direction with respect to the outer diameter D of the heat transfer pipe (3 m$\leq$D$\leq$7.5 mm) is set at 1.2D$\leq$L1$\leq$1.8D and the pitch L2 between heat transfer pipes in the direction orthogonal to the airflow with respect to the outer diameter D of the heat transfer pipe is set at 2.6D$\leq$L2$\leq$3.5D.

CITATION LIST

Patent Literature

Patent Literature 1: Japanese Laid-open Patent Publication No. 60-3188

SUMMARY

Technical Problem

In order to achieve excellent heat exchange performance in the air cooler consisting of the large number of plate-shaped fins that are arranged in parallel at predetermined intervals and between which an airflow flows and the heat transfer pipes that are perpendicularly inserted into the plate-shaped fins and in which the fluid flows, it is preferable that the heat transfer pipes be disposed relatively densely and the pitches L1 and L2 be set with respect to the outer diameter D of the heat transfer pipe to dispose the heat transfer pipes in equilateral triangles. However, as for welding both ends of the heat transfer pipes and fixing them to headers at each of which multiple heat transfer pipes are assembled, disposing the heat transfer pipes densely makes welding difficult and, in contrast, increasing the pitch between equilateral triangles of the heat transfer pipes in consideration of assembling workability for, for example, welding lowers the heat exchange performance.

The present invention is to solve the above-described problem and an objective of the invention is to provide an air cooler, an intercooler, and a nuclear facility that make it possible to inhibit heat exchange performance from lowering and improve assembling workability.

Solution to Problem

According to an aspect of the present invention, an air cooler includes: a plurality of heat transfer pipes; headers to which both ends of each of the heat transfer pipes that are disposed in parallel are fixed, respectively; a plurality of plate-shaped fins through which each of the heat transfer pipes is penetrated and that are provided at intervals in a direction in which the heat transfer pipes extend between the headers; and a fan that circulates an airflow between the plate-shaped fins, wherein the headers are formed to be sectioned into multiple rows, the heat transfer pipes are disposed densely in a sectioned area of the headers, and the heat transfer pipes are disposed sparsely in an area between the sectioned areas of the headers.

According to the air cooler, disposing the heat transfer pipes in the sectioned area of the headers makes it possible to inhibit the heat exchange performance from lowering, compared to the overall dense structure. Furthermore, disposing the heat transfer pipes 52C sparsely in the area between the headers that are sectioned makes it possible to secure a gap between the heat transfer pipes for disposing, for example, a welding torch and thus improve assembling workability.

Advantageously, in the air cooler, the heat transfer pipes are disposed triangularly, so that the heat transfer pipes are positioned differently between a circulation direction in which the airflow is circulated by the fan and a direction orthogonal to the circulation direction, the heat transfer pipes are disposed in equilateral triangles in the sectioned area of the headers, and the heat transfer pipes are disposed in isosceles triangles in the area between the sectioned areas of the headers.

According to the air cooler, disposing the heat transfer pipes in equilateral triangles makes it possible to maintain heat exchange performance. Furthermore, disposing the heat transfer pipes in isosceles triangles makes it possible to secure a gap for disposing, for example, a welding torch between the heat transfer pipes and thus improve assembling workability.

Advantageously, in the air cooler, a section boarders are disposed in the headers in a direction intersecting with the direction in which the airflow is circulated by the fan.

Because the heat transfer pipes are disposed sparsely in the area between the headers that are sectioned, the interval between the heat transfer pipes increases along the section boarders. Here, when the direction in which the airflow is circulated is along the section boarders, the airflow passes along the area having the increased interval between the heat transfer pipes, which tends to lower heat exchange efficiency. On the other hand, when the direction in which the airflow is circulated intersects with the section boarders, the airflow does not pass along the area having the increased interval between the heat transfer pipes, which tends to improve heat exchange efficiency. Accordingly, disposing the section boarders in the direction intersecting with the direction in which the airflow is circulated makes it possible to improve heat exchange efficiency.

Advantageously, in the air cooler, the plate-shaped fins are formed to be divided into multiple blocks through each of which a predetermined number of the heat transfer pipes are penetrated, division ends correspond to the positions of the section boarders in the headers, end portions of the plate-shaped fins divided into multiple blocks are provided to be faced with each other.

Forming the plate-shaped fins to be divided into the multiple blocks through each of which the predetermined number of the heat transfer pipes is penetrated improves assembling workability. When the plate-shaped fins are divided, dividing the plate-shaped fins according to the area where the pitches between the heat transfer pipes are equal to each other leads to the same structures of the blocks, which is preferable for construction. However, according to the first embodiment, because the heat transfer pipes are disposed sparsely in the area between the headers that are sectioned, when the plate-shaped fins are divided according to the equal pitches between the heat transfer pipes, a gap occurs between the division ends of the blocks divided at the positions corresponding to the section boarders, which may affect the performance. Accordingly, dividing the plate-shaped fins according to the area having equal pitches between the heat transfer pipes, dividing the plate-shaped fins according to the positions between the headers that are sectioned, and causing the division ends to be against with each other makes it possible to maintain the heat exchange performance.

Advantageously, in the air cooler, the plate-shaped fins that are formed to be divided into the blocks are further divided between the section boarders in the headers.

Further dividing the plate-shaped fins that are formed to be divided into the blocks further improves assembling workability.

According to an another aspect of the present invention, an intercooler includes a circulation piping for circulating cooling water for heat exchange using heat generated by a nuclear reactor of a nuclear facility; and the air cooler according to any one of the claims 1 to 5 that is provided to the circulation piping and that acquires the heat of the cooling water in the circulation piping through heat exchange.

According to the intercooler, it is possible to efficiently cools the cooling water in the nuclear facility.

Advantageously, in the intercooler, in the air cooler according to any one of claims 1 to 5, a space in which the airflow circulates is provided on a side where the fan takes in air and on an upstream side according to the airflow with respect to the fan, and a plurality of the air coolers are disposed to be adjacent to each other, and the spaces of the air coolers communicate with each other.

According to the intercooler, the spaces on the upstream side according to the airflow with respect to the respective fans communicate with each other, which makes it possible to inhibit the heat exchange performance from lowering.

According to an another aspect of the present invention, an intercooler includes a plurality of air coolers that are disposed to be adjacent to each other and each of which comprises: a heat exchanger including a plurality of heat transfer pipes and headers to which both ends of each of the heat transfer pipes that are disposed in parallel are fixed, respectively; a fan that circulates an airflow between the heat transfer pipes; and a space in which the airflow circulates and that is provided on a side where the fan takes in air and on an upstream side according to the airflow with respect to the fan, wherein the spaces of the air coolers communicate with each other.

According to the intercooler, the spaces on an upstream side of the airflow with respect to the respective fans communicate with each other, which makes it possible to inhibit the heat exchange performance from lowering.

Advantageously, in the intercooler, the heat exchangers are provided on an upstream side according to the airflows with respect to the spaces.

According to the intercooler, the heat exchangers are disposed on the upstream side according to the airflows with respect to the spaces, which makes it possible to circulate the airflows preferable and thus to inhibit the heat exchange performance from lowering.

Advantageously, in the intercooler, the air cooler includes a plurality of the heat exchangers.

According to the intercooler, each of the air coolers include the heat exchangers, which makes it possible to inhibit the heat exchange performance from lowering.

Advantageously, in the intercooler, at least part of the heat exchangers is set to be opposed to a direction in which the airflows circulate between the heat transfer pipes.

According to the intercooler, at least part of the heat exchangers is set to be opposed to the direction in which the airflow flows, which makes it possible to preferably circulate the airflows to inhibit the heat exchange performance from lowering.

Advantageously, in the intercooler, a partition is provided between the heat exchangers that are provided to be opposed to each other.

According to the intercooler, the partition is provided between the heat exchangers opposed to each other, which makes it possible to inhibit the heat exchange performance from lowering when, for example, a strong wind occurs.

Advantageously, in the intercooler, the header is formed to be sectioned into multiple rows, and the heat transfer pipes are disposed densely in a sectioned area of the header and the heat transfer pipes are disposed sparsely in an area between the sectioned areas of the headers.

According to the intercooler, it is possible to inhibit the heat exchange performance from lowering.

According to an another aspect of the present invention, an intercooler includes a circulation piping for circulating cooling water for heat exchange using heat generated by a nuclear reactor of a nuclear facility; and the intercooler that is provided to the circulation piping and that acquires the heat of the cooling water in the circulation piping through heat exchange.

According to the intercooler, it is possible to efficiently cool the cooling water in the nuclear facility.

According to an another aspect of the present invention, a nuclear facility includes the air cooler; and the intercooler.

According to the nuclear facility, it is possible to cool the cooling water in the nuclear facility efficiently.

Advantageous Effects of Invention

According to the present invention, it is possible to inhibit the heat exchange performance from lowering and improve assembling workability.

DESCRIPTION OF EMBODIMENTS

Embodiments according to the present invention will be described in detail below according to the accompanying drawings. Note that the embodiments are not to be construed to limit the invention. The components of the following embodiments include ones that can be or are easily replaced by those skilled in the art or ones that are substantially the same.

First Embodiment

Figure 1:
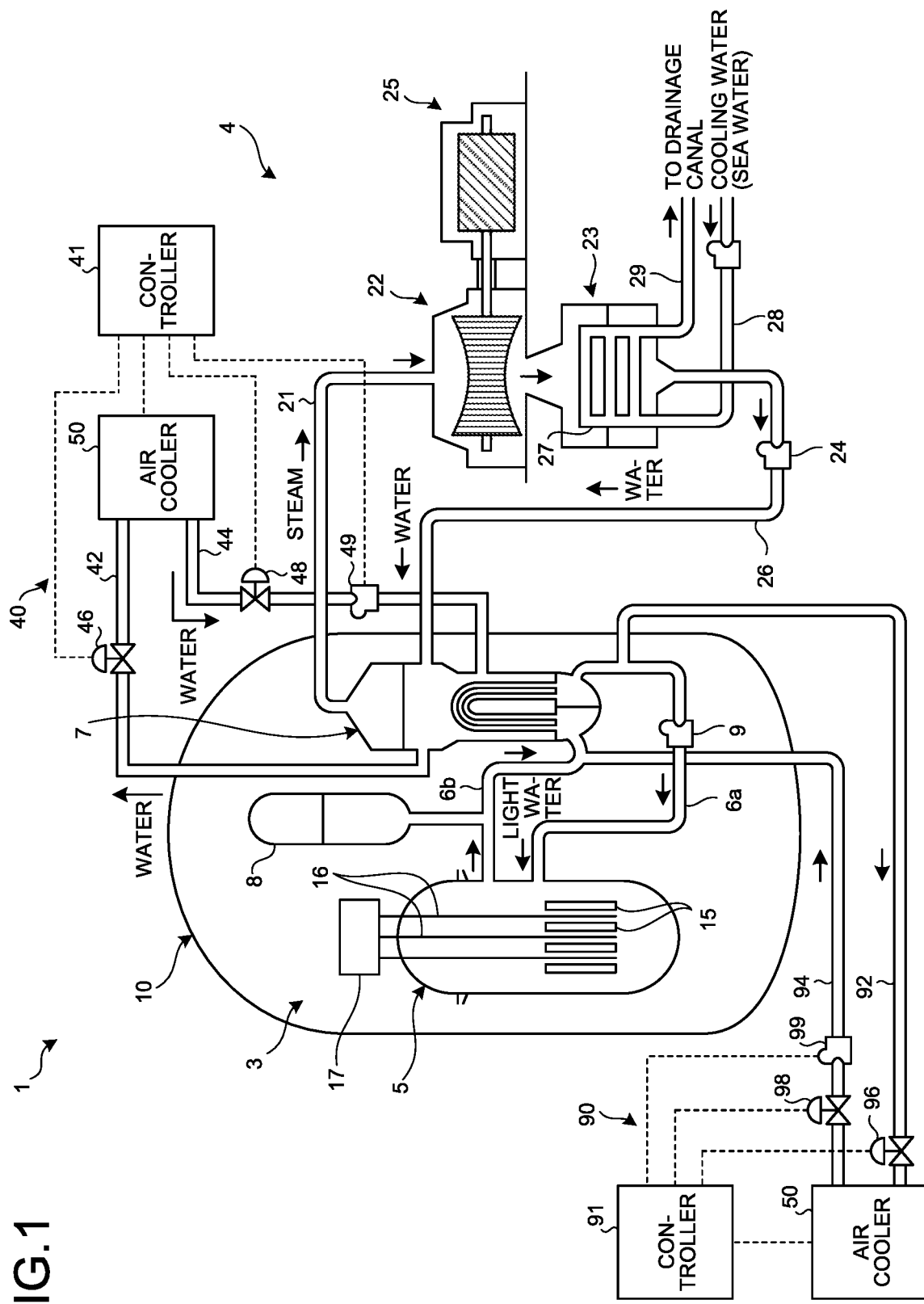
FIG. 1 is a schematic configuration diagram schematically representing a nuclear facility that includes an intercooler according to a first embodiment of the present invention.

FIG. 1 is a schematic configuration diagram schematically representing a nuclear facility that includes an intercooler according to a first embodiment. In the nuclear facility shown in FIG. 1, for example, a pressurized water reactor (PWR) is used as a nuclear reactor 5. A nuclear facility 1 using the PWR nuclear reactor 5 consists of a primary cooling system 3 including the nuclear reactor 5 and a secondary cooling system 4 that exchanges heat with the primary cooling system 3. A primary cooling water serving as cooling water circulates in the primary cooling system 3 and a secondary cooling water serving as cooling water circulates in the secondary cooling system 4.

The primary cooling system 3 includes the nuclear reactor 5 and a steam generator 7 that is connected to the nuclear reactor via a cooling water piping 6a serving as a cold leg and a cooling water piping 6b serving as a hot leg. The cooling water piping 6b is provided with a pressurizer 8. The cooling water piping 6a is provided with a cooling water pump 9. The nuclear reactor 5, the cooling water pipings 6a and 6b, the steam generator 7, the pressurizer 8, and the cooling water pump 9 are housed in a robust containment 10.

The nuclear reactor 5 is a PWR as described above and the inside of the nuclear reactor is filled with the primary cooling water. Inside the nuclear reactor 5, a large number of fuel assemblies 15 are housed and a large number of control rods 16 are provided to be insertable into and extractable from the fuel assemblies 15. The control rods 16 are driven by a control rod driver device 17 in a direction in which the control rods 16 are inserted into and extracted from the fuel assemblies 15. When the control rod driver device 17 causes the control rods 16 to be inserted into the fuel assemblies 15, the burnup in the fuel assemblies 15 is reduced and stops. On the other hand, when the control rod driver device 17 causes the control rods 16 to be extracted, the burnup in the fuel assemblies 15 is enhanced to the critical state. The control rod driver device 17 is configured to insert the control rods 16 into the fuel assemblies 15 when the power supply is terminated to a power loss state.

When nuclear fission of the fuel assemblies 15 is caused by using the control rods 16 while controlling the nuclear fission reaction, the nuclear fission generates thermal energy. The generated thermal energy heats the primary cooling water and the heated primary cooling water is sent to the steam generator 7 via the cooling water piping 6b. On the other hand, the primary cooling water that is sent from the steam generator 7 via the cooling water piping 6a flows into the nuclear reactor 5 to cool the nuclear reactor 5.

The pressurizer 8 that is provided to the cooling water piping 6b pressurizes the primary cooling water at high temperature, thereby controlling boiling of the primary cooling water. The steam generator 7 performs heat exchange between the primary cooling water at high temperature and high pressure and the secondary cooling water to evaporate the secondary cooling water, thereby generating steam and cooling the primary cooling water at high temperature and high pressure. The cooling water pump 9 circulates the primary cooling water through the primary cooling system 3 and sends the primary cooling water from the steam generator 7 into the nuclear reactor 5 via the cooling water piping 6a and sends the primary cooling water from the nuclear reactor 5 via the cooling water piping 6b to the steam generator 7. The diagram shows the mode where one steam generator 7 is provided to one nuclear reactor 5; however, multiple steam generators may be provided.

A set of operations in the primary cooling system 3 of the nuclear facility 1 will be described here. When the primary cooling water is heated with the thermal energy generated by the nuclear fission reaction in the nuclear reactor 5, the heated primary cooling water is sent by the cooling water pump 9 to the steam generator 7 via the cooling water piping 6b serving as a hot leg. The primary cooling water at high temperature that passes through the cooling water piping 6b serving as a hot leg is pressurized by the pressurizer 8 to be inhibited from boiling and, at a high-temperature and high-pressure state, flows into the steam generator 7. The primary cooling water at high temperature and high pressure that have flown into the steam generator 7 is cooled through heat exchange with the secondary cooling water and the cooled primary cooling water is sent by the cooling water pump 9 to the nuclear reactor 5 via the cooling water piping 6a serving as a cold leg. The cooled primary cooling water flows into the nuclear reactor 5, so that the nuclear reactor 5 is cooled. In other words, the primary cooling water circulates between the nuclear reactor 5 and the steam generator 7. The primary cooling water is light water that is used as a coolant and as a neutron moderator.

The secondary cooling system 4 includes a turbine 22 that is connected to the steam generator 7 via a steam pipe 21, a condenser 23 that is connected to the turbine 22, and a water supply pump 24 that is provided to a water supply pipe 26 connecting the condenser 23 and the steam generator 7. A generator 25 is connected to the turbine 22.

A set of operations in the secondary cooling system 4 of the nuclear facility 1 will be described here. When the steam flows from the steam generator 7 via the steam pipe 21 into the turbine 22, the turbine 22 rotates. Once the turbine 22 rotates, the generator 25 connected to the turbine 22 generates power. The steam that flows out of the turbine 22 flows into the condenser 23. A cooling piping 27 is provided in the condenser 23. A water intake piping 28 for supplying cooling water (e.g., sea water) is connected to one end of the cooling piping 27 and a discharge pipe 29 for discharging the cooling water to a drainage canal is connected to the other end of the cooling piping 27. In the condenser 23, the steam flowing from the turbine 22 is cooled by the cooling piping 27 to liquid. The secondary cooling water that returned to liquid is sent by the water supply pump 24 via the water supply pipe 26 to the steam generator 7. Heat exchange between the secondary cooling water sent to the steam generator 7 and the primary cooling water is performed at the steam generator 7, so that the secondary cooling water returns to steam again.

An intercooler 40 is connected to the secondary cooling system 4. The intercooler 40 is a cooling system different from the above-described flow in which the turbine 22 of the secondary cooling system 4 is rotated. The intercooler 40 is a sub cooling system that cools the secondary cooling water in the secondary cooling system 4 when the cooling water cannot be cooled. Operations of the intercooler 40 are controlled by a controller 41.

The intercooler 40 includes a flow-in piping 42 and a flow-out piping 44 that serve as a circulation piping that circulates cooling water (secondary cooling water) for heat exchange using the heat generated by the nuclear reactor 5 of the nuclear facility 1, open/close valves 46 and 48, a pump 49, and an air cooler 50. The flow-in piping 42 is a piping that guides the secondary cooling water in the liquid state (water) in the steam generator 7 to the air cooler 50. The flow-out piping 44 is a piping that guides the secondary cooling water that is cooled by the air cooler 50 to the steam generator 7. The open/close valve 46 is provided to the flow-in piping 42 to switch between opening and closing the flow-in piping 42. The open/close valve 46 is closed to inhibit the secondary cooling water in the steam generator 7 from flowing into the air cooler 50 and is opened to allow the secondary cooling water in the steam generator 7 to flow into the air cooler 50. The open/close valve 48 is disposed in the flow-out piping 44 to switch between opening and closing the flow-out piping 44. The open/close valve 48 is closed to inhibit the secondary cooling water in the air cooler 50 from flowing into the steam generator 7 and is opened to allow the secondary cooling water in the air cooler 50 to flow into the steam generator 7. The pump 49 is set in the flow-out piping 44. The pump 49 sends the secondary cooling water in the flow-out piping 44 to the steam generator 7 to circulate the secondary cooling water flowing through the intercooler 40 between the intercooler 40 and the steam generator 7. The air cooler 50 is an air-cooling cooler that sprays air to the secondary cooling water that is guided by the flow-in piping 42 to perform heat exchange between the air and the secondary cooling water, thereby cooling the secondary cooling water. The structure of the air cooler 50 will be described below.

In the intercooler 40, the open/close valves 46 and 48 are opened and the pump 49 is driven by the controller 41 to circulate a medium serving as the secondary cooling water through the steam generator 7, the flow-in piping 42, the air cooler 50, the flow-out piping 44, and the steam generator 7 according to the order they appear in this sentence. As described above, the flow-in piping 42, the flow-out piping 44, and the air cooler 50 serve as a circulation path through which the secondary cooling water in the steam generator 7 is circulated. Furthermore, in the intercooler 40, the circulating secondary cooling water is cooled by the air cooler 50. Accordingly, the secondary cooling water in the steam generator 7 can be cooled and the primary cooling water can be kept cooled with the secondary cooling water.

Furthermore, an intercooler 90 is connected to the primary cooling system 3. The intercooler 90 is a cooling system different from the above-described flow where heat exchange is performed by the above-described steam generator 7 of the primary cooling system 3. The intercooler 90 is a sub cooling system that cools the primary cooling water in the primary cooling system 3 when the cooling water cannot be cooled. Operations of the intercooler 90 are controlled by a controller 91.

The intercooler 90 includes a flow-in piping 92 and a flow-out piping 94 that serve as a circulation piping for circulating the cooling water (primary cooling water) for heat exchange by using the heat generated by the nuclear reactor 5 of the nuclear facility 1, open/close valves 96 and 98, a pump 99, and an air cooler 50. The flow-in piping 92 is a piping that is connected to a cooling water piping 6a and that guides the primary cooling water supplied from the steam generator 7 to the nuclear reactor 5 to the air cooler 50. The flow-out piping 94 is a piping that is connected to the cooling water piping 6b and that guides the primary cooling water that is cooled by the air cooler 50 to the steam generator 7. The open/close valve 96 is disposed in the flow-in piping 92 and switches between opening and closing the flow-in piping 92. The open/close valve 96 is closed to inhibit the primary cooling water from flowing into the air cooler 50 and is opened to allow the primary cooling water to flow into the air cooler 5. The open/close valve 98 is disposed in the flow-out piping 94 and switches between opening and closing the flow-out piping 94. The open/close valve 98 is closed to inhibit the primary cooling water in the air cooler 50 from flowing into the steam generator 7 and is opened to allow the primary cooling water in the air cooler 50 to flow into the steam generator 7. The pump 99 is set in the flow-out piping 94. The pump 99 sends the primary cooling water in the flow-out piping 94 to the steam generator 7 to circulate the primary cooling water flowing through the intercooler 90 between the intercooler 90 and the steam generator 7. The air cooler 50 is an air-cooling cooler that sprays air to the primary cooling water that is guided by the flow-in piping 92 to perform heat exchange between the air and the primary cooling water, thereby cooling the primary cooling water. The structure of the air cooler 50 will be described below.

In the intercooler 90, the open/close valves 96 and 98 are opened and the pump 99 is driven by the controller 91 to circulate the secondary cooling water through the steam generator 7, the flow-in piping 92, the air cooler 50, the flow-out piping 94, and the steam generator 7 according to the order they appear in this sentence. As described above, the flow-in piping 92, the flow-out piping 94, and the air cooler 50 serve as a circulation path for circulating the primary cooling water in the steam generator 7. Furthermore, in the intercooler 90, the circulating primary cooling water is cooled by the air cooler 50. Accordingly, the primary cooling water in the steam generator 7 can be cooled and the primary cooling water and the secondary cooling water can be kept cooled. The controller 91 may be independent of the above-described controller 41 of the intercooler 40 or the controller 41 and the controller 91 may be a single controller.

Figure 2:
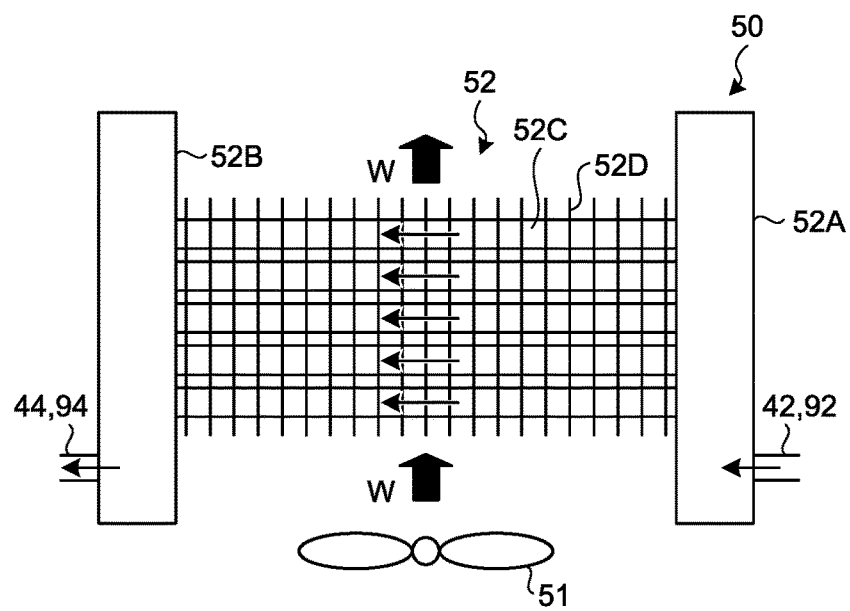
FIG. 2 is a schematic configuration diagram schematically representing an air cooler in the intercooler according to the first embodiment of the present invention.
Figure 3:
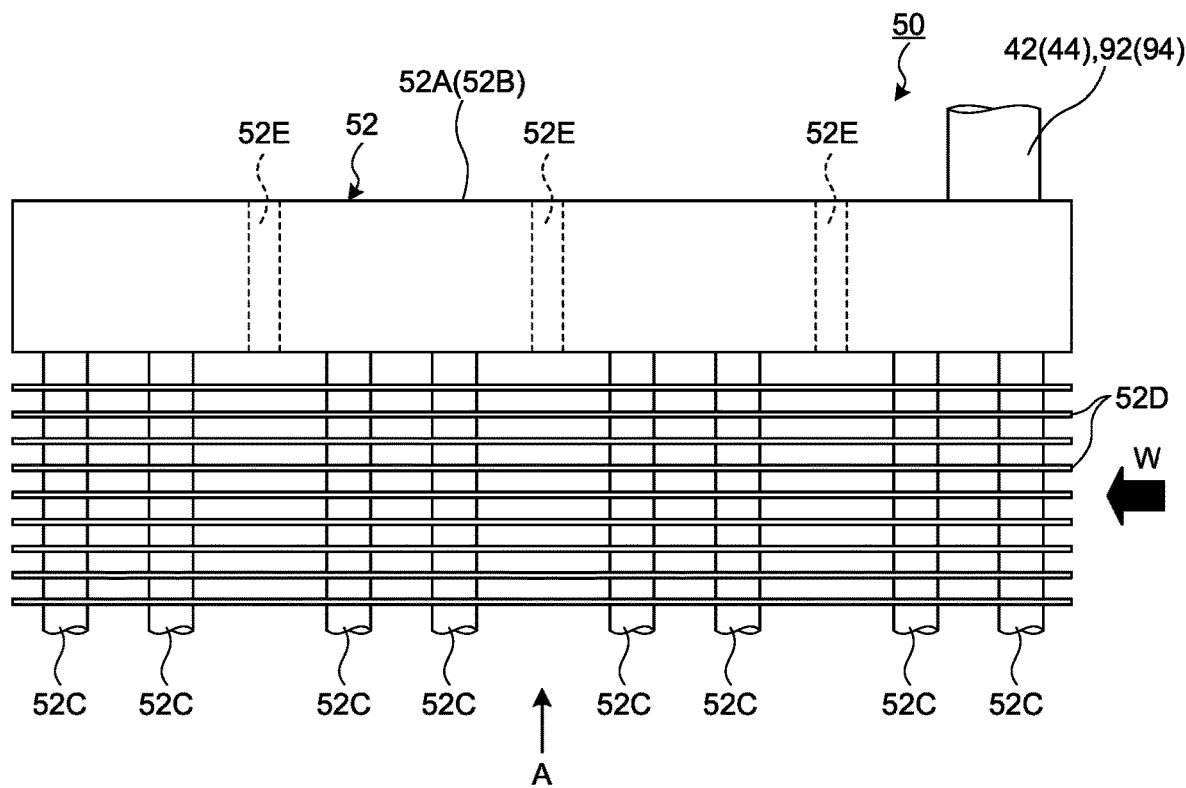
FIG. 3 is a partially-omitted enlarged view of the air cooler according to the first embodiment of the present invention.
Figure 4:
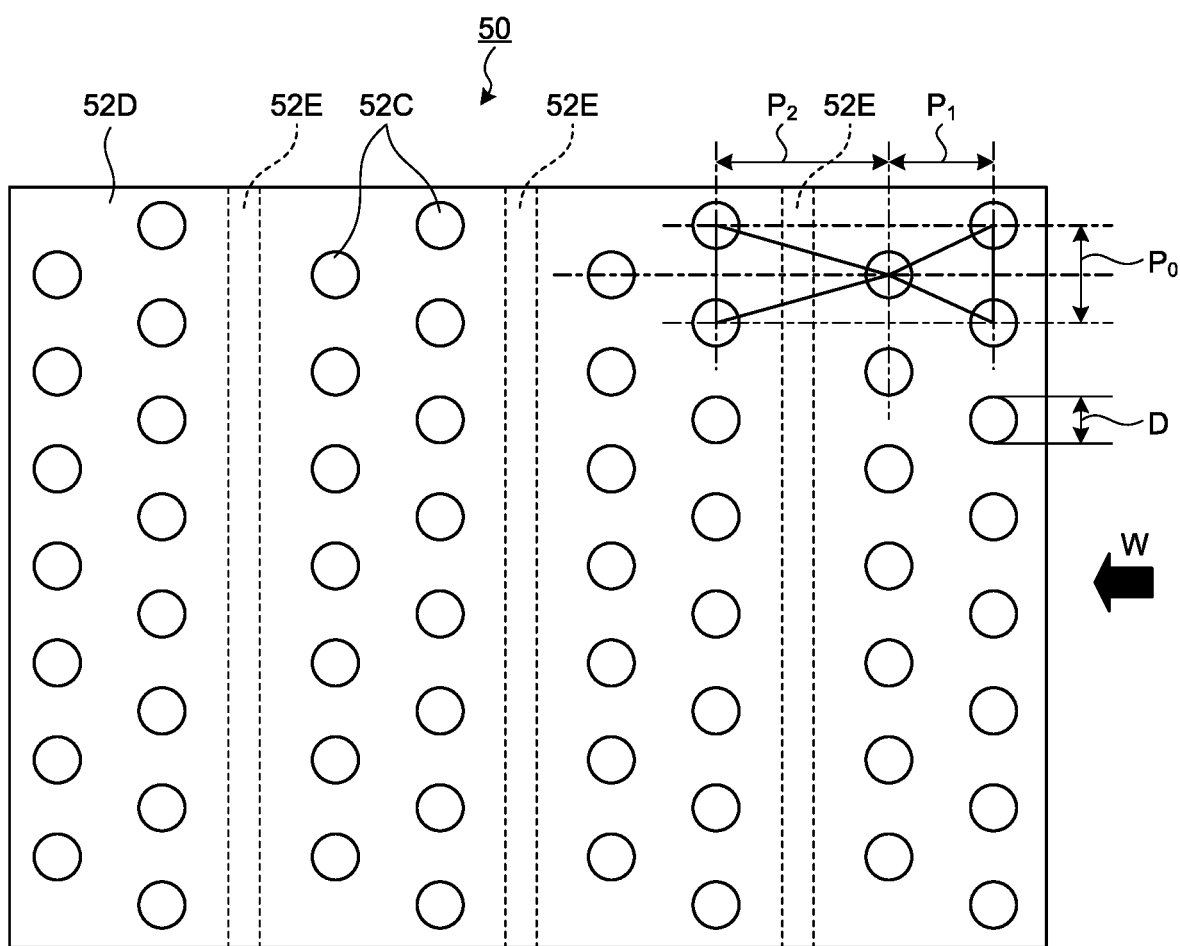
FIG. 4 is a diagram of the air cooler shown in FIG. 3 viewed in the direction denoted by the arrow A.
Figure 5:
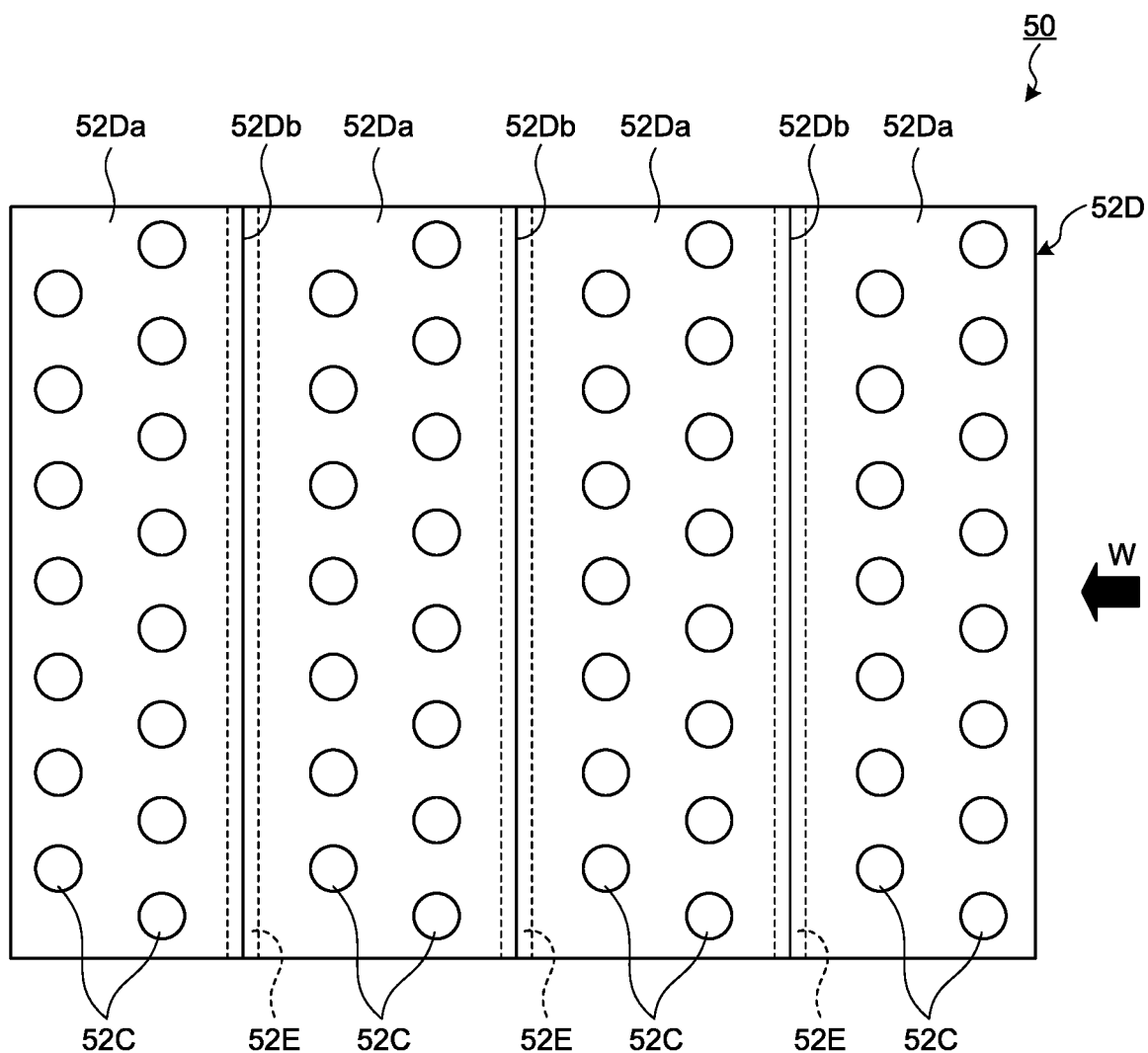
FIG. 5 is a diagram of the air cooler shown in FIG. 3 viewed in the direction denoted by the arrow A, representing a modification.
Figure 6:
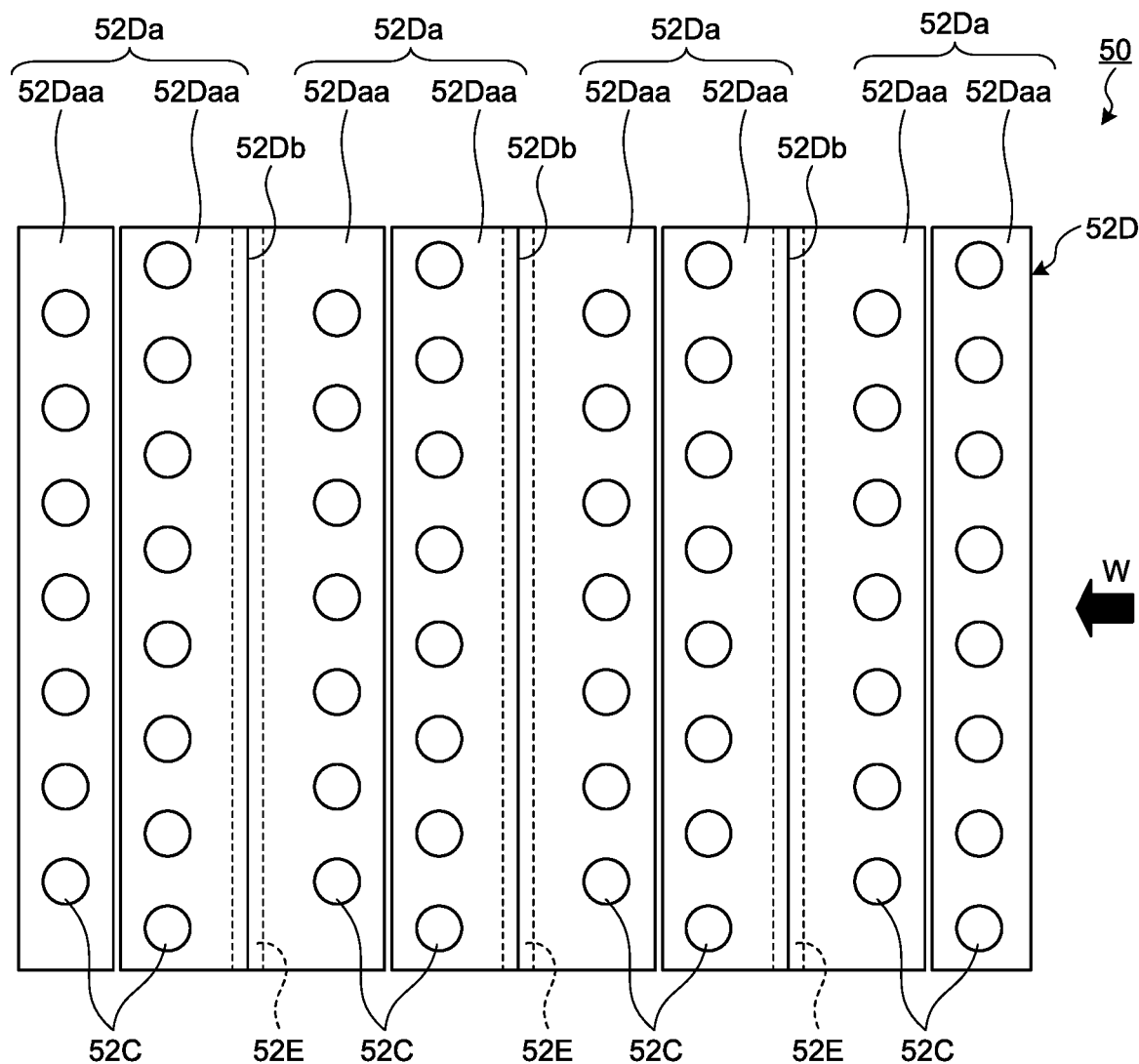
FIG. 6 is a diagram of the air cooler shown in FIG. 3 viewed in the direction denoted by the arrow A, representing a modification.

The structure of the air cooler 50 will be described next. FIG. 2 is a schematic configuration diagram schematically representing the air cooler of the intercooler according to the first embodiment, FIG. 3 is a partially-omitted enlarged view of the air cooler according to the first embodiment of the present invention, FIG. 4 is a diagram of the air cooler shown in FIG. 3 viewed in the direction denoted by the arrow A, FIG. 5 is a diagram of the air cooler shown in FIG. 3 viewed in the direction denoted by the arrow A, representing a modification, and FIG. 6 is a diagram of the air cooler shown in FIG. 3 viewed in the direction denoted by the arrow A. As described above, the air cooler 50 is provided to the intercooler 40 and the intercooler 90. The following descriptions will be on the intercooler 40 and the reference numerals on the intercooler 90 will be represented with brackets.

As shown in FIG. 2, the air cooler 50 includes a fan 51 and a heat exchanger 52. The fan 51 and the heat exchanger 52 are supported outdoors by a frame (not shown) that is set on the ground or a foundation concrete that is provided on the ground.

The fan 51 is an axial fan or a suction fan. According to the first embodiment, the heat exchanger 52 is disposed to be opposed to the fan 51 and the fan 51 is provided between heat exchangers 52. The fan 51 sends air upward from the bottom to send an airflow to each heat exchanger 52 that is opposed to the fan 51.

The heat exchanger 52 includes a first header 52A, a second header 52B, a heat transfer pipe 52C, and a plate-shaped fin 52D. The first header 52A is a container serving as a water chamber (header) that stores the cooling water (the primary cooling water or the secondary cooling water) and the first header 52A is connected to the flow-in piping 42 (92) to supply the cooling water flowing through the flow-in piping 42 (92). The second header 52B is a container serving as a water chamber (header) for storing the cooling water and the second header 52B is connected to the flow-out piping 44 (94) to discharge the stored cooling water to the flow-out piping 44 (94). The heat transfer pipe 52C is provided to extend between the first header 52A and the second header 52B, and the ends of the heat transfer pipe 52C are connected respectively to the first header 52A and the second header 52B. A plurality of heat transfer pipes 52C are disposed in parallel. In other words, the cooling water (medium) that is supplied to the first header 52A is distributed from the first header 52A to flow into each of the heat transfer pipes 52C and the heat transfer pipes 52C collectively send the cooling water to the second header 52B. The plate-shaped fin 52D is formed to be like a thin plate-shaped and is provided to be orthogonal to the direction in which each of the heat transfer pipes 52C extends, so that the heat transfer pipes 52C penetrate through the plate-shaped fin 52D. A plurality of plate-shaped fins 52D are disposed at intervals along the direction in which each of the heat transfer pipes 52C extends. The heat exchanger 52 cools the cooling water by causing heat exchange between the cooling water flowing in from the flow-in piping 42 (92) and the airflow guided by the fan 51 to cool the cooling water.

In the heat exchanger 52 according to the first embodiment, the inner diameter of the heat transfer pipe 52C is approximately 10 mm to 20 mm and the thickness of the plate-shaped fin 52D is approximately 0.2 mm to 0.5 mm, and the pitch between the plate-shaped fins 52D is approximately 2 mm to 3 mm. The heat transfer pipes 52C are formed of, for example, carbon steel or stainless steel. The plate-shaped fins 52D are formed of, for example, aluminum alloy or copper. The plate-shaped fins 52D are coated with, for example, a resin material to prevent erosion.

As shown in FIGS. 3 and 4, the first header 52A and the second header 52B are formed to be sectioned into multiple rows. Specifically, according to FIGS. 3 and 4, a plurality of partitions 52E that section the inside of the first header 52A and the second header 52B into multiple rows are provided. Sectioning the inside of the first header 52A with the partitions 52E causes the cooling water to be distributed to each section on the side of the first header 52A and to be further distributed from the sections to the heat transfer pipes 52C to permeate the cooling water through each of the heat transfer pipes 52C, thereby improving the heat exchange efficiency. On the other hand, sectioning the inside of the second header 52B with the partitions 52E causes the cooling water in the sections to be collectively received on the side of the second header 52B and to be further discharged collectively from the second header 52B, thereby collecting the cooling water distributed at the side of the first header 52A while reducing the pressure loss of the cooling water. The sections formed by the partitions 52E are formed to converge at the position of the flow-in piping 42 (92) and the flow-out piping 44 (94).

As shown in FIG. 4, the heat transfer pipes 52C are disposed densely in the sectioned area of the first header 52A and the second header 52B, i.e., in the area between the provided partitions 52E, and are disposed sparsely in the area between the sectioned areas of the first header 52A and second header 52B, i.e., in the area where the partition 52E is positioned at the center.

Specifically, as shown in FIG. 4, the heat transfer pipes 52C are disposed triangularly, so that the heat transfer pipes 52C are positioned differently between a circulation direction W in which the airflow is circulated by the fan 51 and the direction orthogonal to the circulation direction W. A pitch $P_0$ between the heat transfer pipes 52C in the direction orthogonal to the circulation direction W serving as the base of the triangular disposition has a relation with respect to the outer diameter D of the heat transfer pipe 52C of $1.6 \leq P_0/D \leq 2.5$. In the area between the provided partitions 52E, a pitch $P_1$ between the heat transfer pipes 52C in the circulation direction W has a relation with respect to the outer diameter D of the heat transfer pipe 52C of $1.6 \leq P_1/D \leq 2.5$. In other words, in the area between the provided partitions 52E, the heat transfer pipes 52C are disposed at the equal pitches $P_0$ and $P_1$ in the direction orthogonal to the circulation direction W and in the circulation direction W. Preferably, the heat transfer pipes 52C are disposed in equilateral triangles. On the other hand, in the area where the partition 52E is positioned at the center, a pitch $P_2$ between the heat transfer pipes 52C in the circulation direction W has a relation with respect to the outer diameter D of the heat transfer pipe 52C of $2.5 \leq P_2/D \leq 8$. In other words, in the area where the partition 52E is positioned at the center, the heat transfer pipes 52C are disposed at the pitches $P_2$ in the circulation direction W larger than the pitch $P_0$ in the direction orthogonal to the circulation direction W. In other words, the heat transfer pipes 52C are disposed in isosceles triangles.

As described above, the air cooler 50 according to the first embodiment includes the heat transfer pipes 52C; the first header 52A and the second header 52B to which both ends of the heat transfer pipes 52C that are disposed in parallel are fixed respectively; the plate-shaped fins 52D through which each of the heat transfer pipes 52C is penetrated and that are provided at intervals in the direction in which the heat transfer pipes 52C extend between the first header 52A and the second header 52B; and the fan 51 that circulates the airflow between the plate-shaped fins 52D, wherein the partitions 52E that section the inside of the first header 52A and the second header 52B into the multiple rows are provided, the heat transfer pipes 52C are disposed densely in the area between the provided partitions 52E, and the heat transfer pipes 52C are disposed sparsely in the area where the partition 52E is positioned at the center.

According to the air cooler 50, disposing the heat transfer pipes 52C densely in the area between the provided partitions 52E makes it possible to inhibit the heat exchange performance from lowering, compared to the overall dense structure (where, for example, $1.6 \leq P_0/D \leq 2.5$ and $1.6 \leq P_1/D \leq 2.5$). Furthermore, disposing the heat transfer pipes 52C sparsely in the area where the partition 52E is positioned at the center makes it possible to secure a gap between the heat transfer pipes 52C for disposing, for example, a welding torch and thus improve assembling workability.

For example, as shown in FIG. 4, in the area between the provided partitions 52E, the pitches $P_0$ and $P_1$ between the heat transfer pipes 52C in the direction orthogonal to the circulation direction W and in the circulation direction W have relations with respect to the outer diameter D of the heat transfer pipe 52C of $1.6 \leq P_0/D \leq 2.5$ and $1.6 \leq P_1/D \leq 2.5$, respectively. Here, the heat exchange performance is maintained at high level. On the other hand, in the area where the partition 52E is positioned at the center, the pitch $P_2$ between the heat transfer pipes 52C in the circulation direction W has a relation with respect to the outer diameter D of the heat transfer pipe 52C of $2.5 \leq P_2/D \leq 8$. Here, the heat exchange performance may lower, but a gap for disposing, for example, a welding torch can be secured between the heat transfer pipes 52C, which improves assembling workability.

In the air cooler 50 according to the first embodiment, it is preferable that the heat transfer pipes 52C be disposed triangularly, so that the heat transfer pipes 52C are positioned differently between the circulation direction W in which the airflow is circulated by the fan 51 and the direction orthogonal to the circulation direction W, be disposed in equilateral triangles in the area between the provided partitions 52E, and be disposed in isosceles triangles in the area where the partition 52E is positioned at the center.

According to the air cooler 50, disposing the heat transfer pipes 52C in equilateral triangles makes it possible to maintain heat exchange performance. Furthermore, disposing the heat transfer pipes 52C in isosceles triangles makes it possible to secure a gap for disposing, for example, a welding torch between the heat transfer pipes 52C and thus improve assembling workability.

In the air cooler 50 according to the first embodiment, as shown in FIG. 4, it is preferable that the partitions 52E be disposed to extend in the direction intersecting with the circulation direction W in which the airflow is circulated by the fan 51.

Because the heat transfer pipes 52C are disposed sparsely ($2.5 \leq P_2/D \leq 4$) in the area where the partition 52E is positioned at the center, the interval between the heat transfer pipes 52C increases along the partition 52E. Here, when the airflow circulation direction W is along the partition 52E, the airflow passes along the area having the increased interval between the heat transfer pipes 52C, which tends to lower heat exchange efficiency. On the other hand, when the airflow circulation direction W intersects with the direction in which the partition 52E extends, the airflow does not pass along the area having the increased interval between the heat transfer pipes 52C, which tends to improve heat exchange efficiency. Accordingly, disposing the partitions 52E in the direction intersecting with the circulation direction W in which the airflow is circulated by the fan 51 makes it possible to improve heat exchange efficiency. In order to achieve an effect of improving heat exchange efficiency significantly, it is preferable to dispose the partitions 52E to extend in the direction orthogonal to the circulation direction W in which the airflow is circulated by the fan 51.

Furthermore, in the air cooler 50 according to the first embodiment, it is preferable as shown in FIG. 5 that the plate-shaped fin 52D be formed to be divided into multiple blocks 52Da through each of which a predetermined number of heat transfer pipes 52C are penetrated and, when viewed in the direction in which the heat transfer pipes 52C extend, division ends 52Db correspond to the positions in which the partitions 52E are provided and the division ends be provided to be against with each other.

Forming the plate-shaped fins 52C to be divided into the blocks 52Da through each of which a predetermined number of heat transfer pipes 52C is penetrated improves assembling workability. When the plate-shaped fins 52D are divided, dividing the plate-shaped fins 52D according to the area where the pitches between the heat transfer pipes 52C are equal to each other (which means that the pitches $P_0$ and $P_1$ between the heat transfer pipes 52C in the direction orthogonal to the circulation direction W and in the circulation direction W have relations with respect to the outer diameter D of the heat transfer pipe 52C of $1.6 \leq P_0/D \leq 2.5$ and $1.6 \leq P_1/D \leq 2.5$) leads to the same structures of the blocks 52Da, which is preferable for construction. However, according to the first embodiment, because the heat transfer pipes 52C are disposed sparsely in the area where the partition 52E is positioned at the center, when the plate-shaped fins 52D are divided according to the equal pitches between the heat transfer pipes 52C, a gap occurs between the division ends 52Db of the blocks 52Da divided at the positions corresponding to the partitions 52E, which may affect the performance. For example, when there is a shortage in the heat transfer area, the heat transfer area can be increased by dividing the plate-shaped fins 52D according to the area having equal pitches between the heat transfer pipes 52C, by dividing the plate-shaped fins 52D according to the positions in which the partitions 52E are provided, and by causing the division ends 52Db to be against with each other. In the area where the division ends 52Db are against with each other, the division ends 52Db may be against with each other in a convex and concave manner or may be superimposed with each other on a slope to be against with each other to adjust the performance.

In the air cooler 50 according to the first embodiment, as shown in FIG. 6, when viewed in the direction in which the heat transfer pipes 52C extend, it is preferable that the plate-shaped fins 52D that are formed to be divided into the blocks 52Da according to FIG. 5 be further divided between the areas in each of which the partition 52E is provided, (between section boarders in the first header 52A and the second header 52B), into a plurality of small blocks 52Daa.

Because the plate-shaped fins 52D that are formed to be divided into the blocks 52Da are further divided, the assembling workability further improves. When the plate-shaped fins 52D that are formed to be divided into the blocks 52Da are further divided, it is preferable that, as shown in FIG. 6, the plate-shaped fins 52D be divided according to each row of the heat transfer pipe 52C (here per row) parallel to division of the blocks 52Da, because the further divided small blocks 52Daa include approximately the same structures.

Furthermore, the intercooler 40 (90) according to the first embodiment includes the flow-in piping 42 (92) and the flow-out piping 44 (94) that serve as the circulation piping for circulating the cooling water (the primary cooling water or the secondary cooling water) for heat exchange using the heat generated by the nuclear reactor 5 of the nuclear facility 1 and the above-described air cooler 50 that is provided to the circulation piping and that acquires the heat of the cooling water in the circulation piping through heat exchange.

According to the intercooler 40 (90), it is possible to efficiently cool the cooling water in the nuclear facility 1.

Figure 7:
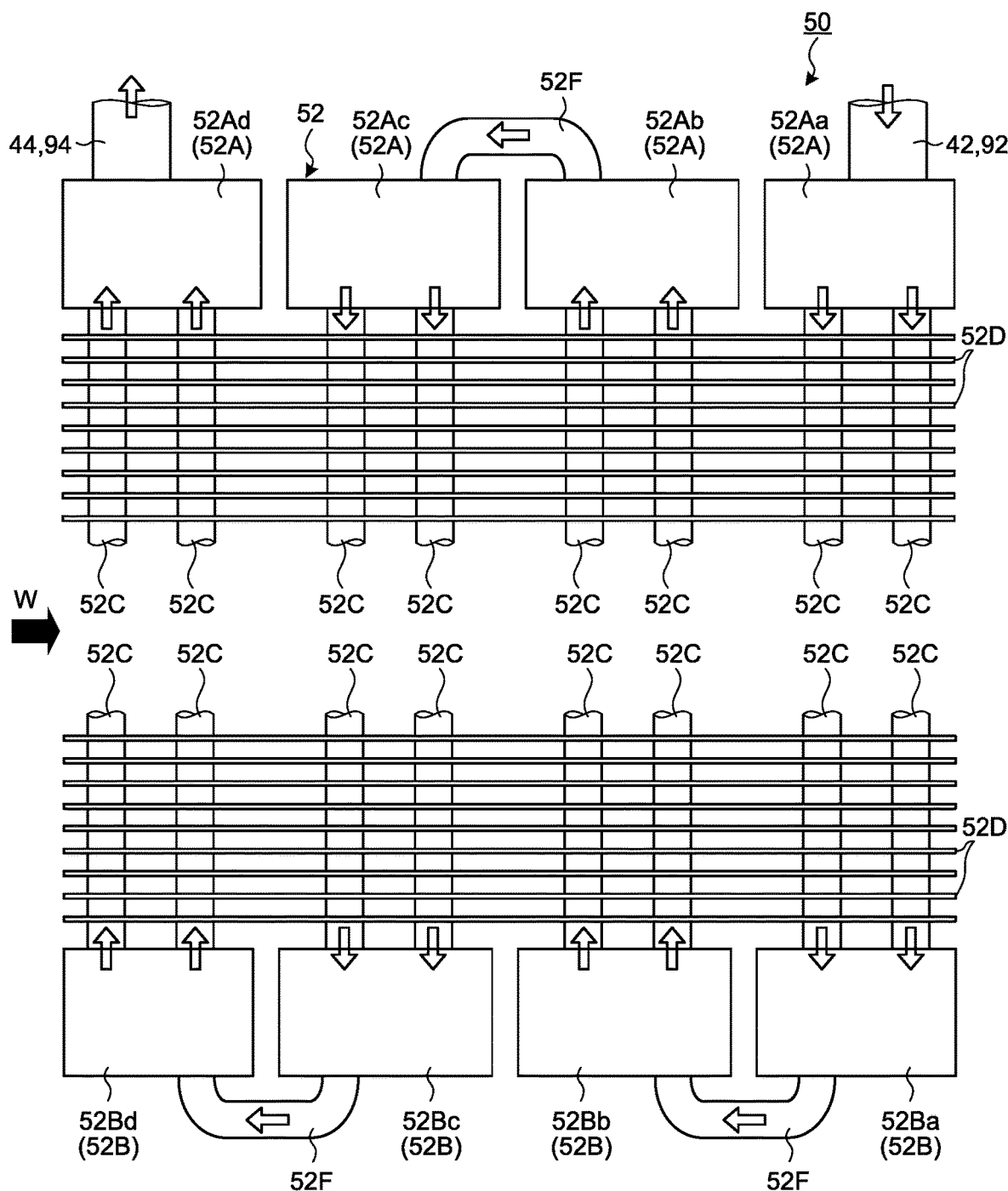
FIG. 7 is a partially-omitted enlarged view of another air cooler according to the first embodiment of the present invention.

FIG. 7 is a partially-omitted enlarged view of another air cooler according to the first embodiment of the present invention. As described above, the air cooler 50 is provided to the intercooler 40 and the intercooler 90. The following descriptions are on the intercooler 40 and the reference numerals on the intercooler 90 will be represented with brackets.

The air cooler shown in FIG. 7 is different from the air cooler 50 shown in FIG. 2 in the configuration of the heat exchanger 52 and is equivalent to the air cooler 50 in the fan 51.

As shown in FIG. 7, the heat exchanger 52 includes the first header 52A, the second header 52B, the heat transfer pipes 52C, and the plate-shaped fins 52D. The first header 52A and the second header 52B are containers serving as water chambers (headers) that store the cooling water (a primary cooling water and a secondary cooling water) and are connected to the flow-out piping 44 (94) to discharge the stored cooling water to the flow-out piping 44 (94) while being connected to the flow-in piping 42(92) to supply the cooling water flowing through the flow-in piping 42 (92). The heat transfer pipe 52C is provided to extend between the first header 52A and the second header 52B and the ends of the heat transfer pipe 52C is connected to the first header 52A and the second header 52B respectively. The heat transfer pipe 52C is provided to extend between the first header 52A and the second header 52B, and the ends of the heat transfer pipe 52C are connected respectively to the first header 52A and the second header 52B. A plurality of heat transfer pipes 52C are disposed in parallel. The plate-shaped fin 52D is formed to be like a thin plate and is provided orthogonally to the direction in which each heat transfer pipe 52C extends, so that the heat transfer pipes 52C penetrate through each plate-shaped fin 52D. A plurality of plate-shaped fins 52D are disposed at intervals along the direction in which each heat transfer pipe 52C extend. The heat exchanger 52 cools the cooling water by causing heat exchange between the cooling water flowing in from the flow-in piping 42 (92) and the airflow that is guided by the fan 51.

In the heat exchanger 52 according to the first embodiment shown in FIG. 7, the inner diameter of the heat transfer pipe 52C is approximately 10 mm to 20 mm and the thickness of the plate-shaped fin 52D is approximately 0.2 mm to 0.5 mm, and the pitch between the plate-shaped fins 52D is approximately 2 mm to 3 mm. The heat transfer pipes 52C are formed of, for example, carbon steel or stainless steel. The plate-shaped fins 52D are formed of aluminum alloy or copper. The plate-shaped fins 52D are coated with a resin material to prevent erosion.

As shown in FIG. 7, the first header 52A and the second header 52B are formed to be sectioned into multiple rows. Specifically, the first header 52A and the second header 52B are formed to be divided. According to FIG. 7, the first header 52A is formed to be divided into four rows of first division headers 52Aa, 52Ab, 52Ac and 52Ad. The second header 52B is formed to be divided into four rows of second division headers 52Ba, 52Bb, 52Bc and 52Bd. The first division header 52Aa and the second division header 52Ba are disposed to be opposed to each other and are connected with the heat transfer pipes 52C. The first division header 52Ab and the second division header 52Bb are disposed to be opposed to each other and are connected with the heat transfer pipes 52C. The first division header 52Ac and the second division header 52Bc are disposed to be opposed to each other and are connected with the heat transfer pipes 52C. The first division header 52Ad and the second division header 52Bd are disposed to be opposed to each other and are connected with the heat transfer pipes 52C. Furthermore, the flow-in piping 42 (92) is connected to the first division header 52Aa and the flow-out piping 44 (94) is connected to the first division header 52Ad. Furthermore, the first division header 52Ab and the first division header 52Ac are connected to each other via a connection pipe 52F, the second division header 52Ba and the second division header 52Bb are connected to each other via a connection pipe 52F, and the second division header 52Bc and the second division header 52Bd are connected to each other via a connection pipe 52F. Accordingly, the cooling water supplied from the flow-in piping 42 (92) is sent from the first division header 52Aa to the second division header 52Ba via the heat transfer pipes 52C, is sent from the second division header 52Ba to the second division header 52Bb via the connection pipe 52F, is sent from the second division header 52Bb to the first division header 52Ab via the heat transfer pipes 52C, is sent from the first division header 52Ab to the first division header 52Ac via the connection pipe 52F, is sent from the first division header 52Ac to the second division header 52Bc via the heat transfer pipes 52C, is sent from the second division header 52Bc to the second division header 52Bd via the connection pipe 52F, is sent from the second division header 52Bd to the first division header 52Ad via the heat transfer pipes 52C, and is discharged to the flow-out piping 44 (94). As described above, each of the first header 52A and the second header 52B is formed to be divided into multiple rows to distribute the cooling water to each header and further distribute the cooling water to the heat transfer pipes 52C to allow the cooling water to permeate through each of the heat transfer pipes 52C, which makes it possible to improve the heat exchange efficiency. There is no limitation on the number of rows into which the first header 52A and the second header 52B are divided.

The heat transfer pipes 52C are disposed densely in the sectioned area of the first header 52A and the second header 52B, i.e., in the area of the divided division header, and are disposed sparsely in the area between the sectioned areas of the first header 52A and the second header 52B, i.e., in the area between adjacent division headers. In this structure, it does not matter whether to provide gaps between the first division headers 52Aa, 52Ab, 52Ac and 52Ad and the second division headers 52Ba, 52Bb, 52Bc and 52Bd. For example, when gaps are provided, it is assumed that gaps corresponding to the thickness of the partition 52E may be provided. When no gap is provided, it may be assumed that the thickness of the adjacent division headers is increased by the thickness of the partition 52E shown in FIG. 4.

As can be seen with reference to FIG. 4, the heat transfer pipes 52C are disposed triangularly, so that the heat transfer pipes 52C are positioned differently between the circulation direction W in which an airflow is circulated by the fan 51 and the direction orthogonal to the circulation direction W. A pitch $P_0$ between the heat transfer pipes 52C in the direction orthogonal to the circulation direction W serving as the base of the triangular disposition has a relation with respect to the outer diameter D of the heat transfer pipe 52C of $1.6 \leq P_0/D \leq 2.5$. In the area of the divided division header, a pitch $P_1$ between the heat transfer pipes 52C in the circulation direction W has a relation with respect to the outer diameter D of the heat transfer pipe 52C of $1.6 \leq P_1/D \leq 2.5$. In other words, In the area of the divided division header, the heat transfer pipes 52C are disposed at the equal pitches $P_0$ and $P_1$ in the direction orthogonal to the circulation direction W and in the circulation direction W. Preferably, the heat transfer pipes 52C are disposed in equilateral triangles. On the other hand, in the area between adjacent division headers, a pitch $P_2$ between the heat transfer pipes 52C in the circulation direction W has a relation with respect to the outer diameter D of the heat transfer pipe 52C of $2.5 \leq P_2/D \leq 8$. In other words, in the area between adjacent division headers, the heat transfer pipes 52C are disposed at the pitches $P_2$ in the circulation direction W larger than the pitch $P_0$ in the direction orthogonal to the circulation direction W. In other words, the heat transfer pipes 52C are disposed in isosceles triangles.

In the heat exchanger 52 shown in FIG. 7, it is preferable that the airflow caused by the fan 51 be in the circulation direction W from the side of the flow-out piping 44 (94) toward the flow-in piping 42(92). Sending the airflow from the downstream side at a low temperature of discharge from the heat exchanger 52 via the heat transfer pipes 52C makes it possible to increase the volume of heat exchange, which improves heat exchange performance.

As described above, the air cooler 50 according to the first embodiment shown in FIG. 7 includes the heat transfer pipes 52C; the first header 52A and the second header 52B to which both ends of each of the heat transfer pipes 52C that are disposed in parallel are fixed respectively; the plate-shaped fins 52D through which each of the heat transfer pipes 52C is penetrated and that are provided at intervals in the direction in which the heat transfer pipes 52C extend between the first header 52A and the second header 52B; and the fan 51 that circulates the airflow between the plate-shaped fins 52D, wherein the first header 52A and the second header 52B are formed to be sectioned into the multiple rows, the heat transfer pipes 52C are disposed densely in the sectioned area of the first header 52A and the second header 52B, and the heat transfer pipes 52C are disposed sparsely in the area between the sectioned areas of the first header 52A and second header 52B.

According to the air cooler 50, compared to the overall dense structure (where, for example, $1.6 \leq P_0/D \leq 2.5$ and $1.6 \leq P_1/D \leq 2.5$), disposing the heat transfer pipes 52C densely in the sectioned area of the first header 52A and the second header 52B makes it possible to inhibit the heat exchange performance from lowering. Furthermore, disposing the heat transfer pipes 52C sparsely in the area between the sectioned areas of the first header 52A and second header 52B makes it possible to secure a gap between the heat transfer pipes 52C for disposing, for example, a welding torch and thus improve assembling workability.

For example, as can be seen with reference to FIG. 4, in the sectioned area of the first header 52A and the second header 52B, the pitches $P_0$ and $P_1$ between the heat transfer pipes 52C in the direction orthogonal to the circulation direction W and in the circulation direction W have relations with respect to the outer diameter D of the heat transfer pipe 52C of $1.6 \leq P_0/D \leq 2.5$ and $1.6 \leq P_1/D \leq 2.5$. Here, the heat exchange performance is maintained at high level. On the other hand, in the area between the sectioned areas of the first header 52A and second header 52B, the pitch $P_2$ between the heat transfer pipes 52C in the circulation direction W has a relation with respect to the outer diameter D of the heat transfer pipe 52C of $2.5 \leq P_2/D \leq 8$. Here, the heat exchange performance may lower, but a gap for disposing, for example, a welding torch can be secured between the heat transfer pipes 52C, which improves assembling workability.

In the air cooler 50 according to the first embodiment shown in FIG. 7, it is preferable that the heat transfer pipes 52C be disposed triangularly, so that the heat transfer pipes 52C are positioned differently between the circulation direction W in which the airflow is circulated by the fan 51 and the direction orthogonal to the circulation direction W, be disposed in equilateral triangles in the sectioned area of the first header 52A and the second header 52B, and be disposed in isosceles triangles in the area between the sectioned areas of the first header 52A and second header 52.

According to the air cooler 50, disposing the heat transfer pipes 52C in equilateral triangles makes it possible to maintain heat exchange performance. Furthermore, disposing the heat transfer pipes 52C in isosceles triangles makes it possible to secure a gap for disposing, for example, a welding torch between the heat transfer pipes 52C and thus improve assembling workability.

In the air cooler 50 according to the first embodiment shown in FIG. 7, it is preferable with reference to FIG. 4 that, in the first header 52A and the second header 52B, the section boarders divided in the direction intersecting with the circulation direction W in which the airflow is circulated by the fan 51 be disposed. The section boarders referred to herein correspond to the positions of the partitions 52E shown in FIG. 4.

Because the heat transfer pipes 52C are disposed sparsely ($2.5 \leq P_2/D \leq 4$) in the area between the sectioned areas of the first header 52A and the second header 52B, the interval between the heat transfer pipes 52C increases along the divided section boarder. Here, when the airflow circulation direction W is along the section boarder, the airflow passes along the area having the increased interval between the heat transfer pipes 52C, which tends to lower heat exchange efficiency. On the other hand, when the airflow circulation direction W intersects with the direction in which the section boarder extends, the airflow does not pass along the area having the increased interval between the heat transfer pipes 52C, which tends to improve heat exchange efficiency. Accordingly, disposing the divided section boarders in the direction intersecting with the circulation direction W in which airflow is circulated by the fan 51 makes it possible to improve heat exchange efficiency. In order to achieve an effect of improving heat exchange efficiency significantly, it is preferable to dispose the divided section boarders to extend in the direction orthogonal to the circulation direction W in which the airflow is circulated by the fan 51.

Furthermore, in the air cooler 50 according to the first embodiment shown in FIG. 7, as can be seen with reference to FIG. 7, it is preferable that the plate-shaped fin 52D be formed to be divided into multiple blocks 52Da through each of which a predetermined number of heat transfer pipes 52C is penetrated and, when viewed in the direction in which the heat transfer pipes 52C extend, division ends 52Db correspond to the positions of the section boarders in the first header 52A and the second header 52B and the division ends 52Db be provided to be against with each other. The positions of the section boarders in the first header 52A and the second header 52B referred herein correspond to the positions of the partitions 52E shown in FIG. 5.

Forming the plate-shaped fins 52C to be divided into the blocks 52Da through each of which a predetermined number of heat transfer pipes 52C is penetrated improves assembling workability. When the plate-shaped fins 52D are divided, dividing the plate-shaped fins 52D according to the area where the pitches between the heat transfer pipes 52C are equal to each other (which means that the pitches $P_0$ and $P_1$ between the heat transfer pipes 52C in the direction orthogonal to the circulation direction W and in the circulation direction W have relations with respect to the outer diameter D of the heat transfer pipe 52C of $1.6 \leq P_0/D \leq 2.5$ and $1.6 \leq P_1/D \leq 2.5$) leads to the same structures of the blocks 52Da, which is preferable for construction. However, according to the first embodiment, because the heat transfer pipes 52C are disposed sparsely in the area between the sectioned areas of the first header 52A and the second header 52B, when the plate-shaped fins 52D are divided according to the equal pitches between the heat transfer pipes 52C, a gap occurs between the division ends 52Db of the blocks 52Da divided at the positions of the section boarders in the first header 52A and the second header 52B, which may affect the performance. For example, when there is a shortage in the heat transfer area, the heat transfer area can be increased by dividing the plate-shaped fins 52D according to the area having equal pitches between the heat transfer pipes 52C, by dividing the plate-shaped fins 52D according to the positions of the section boarders in the first header 52A and the second header 52B, and by causing the division ends 52Db to be against with each other. In the area where the division ends 52Db are against with each other, the division ends 52Db may be against with each other in a convex and concave manner or may be superimposed with each other on a slope to be against with each other to adjust the performance.

In the air cooler 50 according to the first embodiment shown in FIG. 7, as can be seen with reference to FIG. 6, when viewed in the direction in which the heat transfer pipes 52C extend, it is preferable that the plate-shaped fins 52D that are formed to be divided into the blocks 52Da according to FIG. 5 be further divided between the section boarders in the first header 52A and the second header 52B into a plurality of small blocks 52Daa. The positions of the section boarders in the first header 52A and the second header 52B correspond to the positions of the partitions 52E shown in FIG. 6.

Because the plate-shaped fins 52D that are formed to be divided into the blocks 52Da are further divided, the assembling workability further improves. When the plate-shaped fins 52D that are formed to be divided into the blocks 52Da are further divided, it is preferable that, as can be seen with reference FIG. 6, the plate-shaped fins 52D be divided according to each row of the heat transfer pipe 52C (here per row) parallel to division of the blocks 52Da, because the further divided small blocks 52Daa include approximately the same structures.

Second Embodiment

Figure 8:
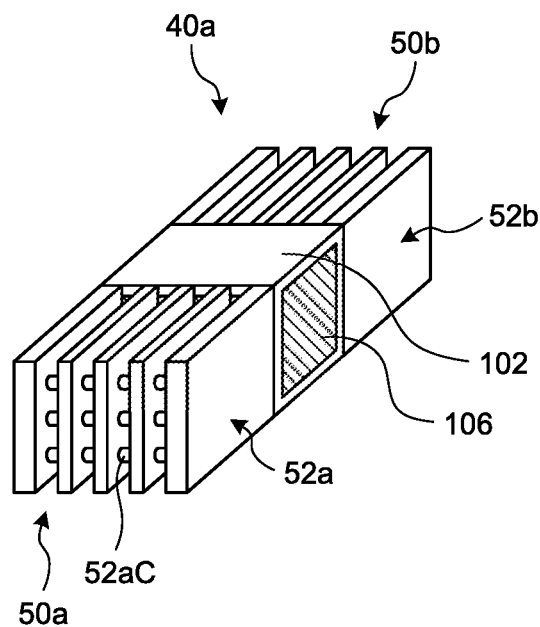
FIG. 8 is a schematic diagram showing an exemplary intercooler according to a second embodiment.
Figure 9:
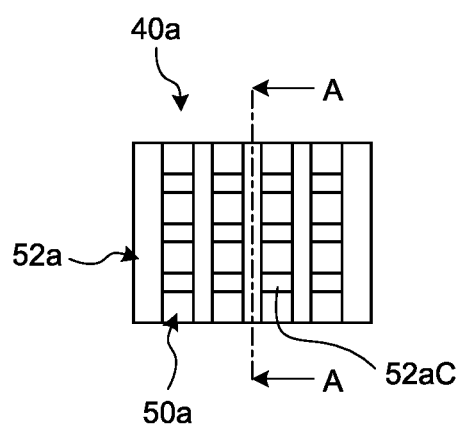
FIG. 9 is a front view showing the exemplary intercooler according to the second embodiment.
Figure 10:
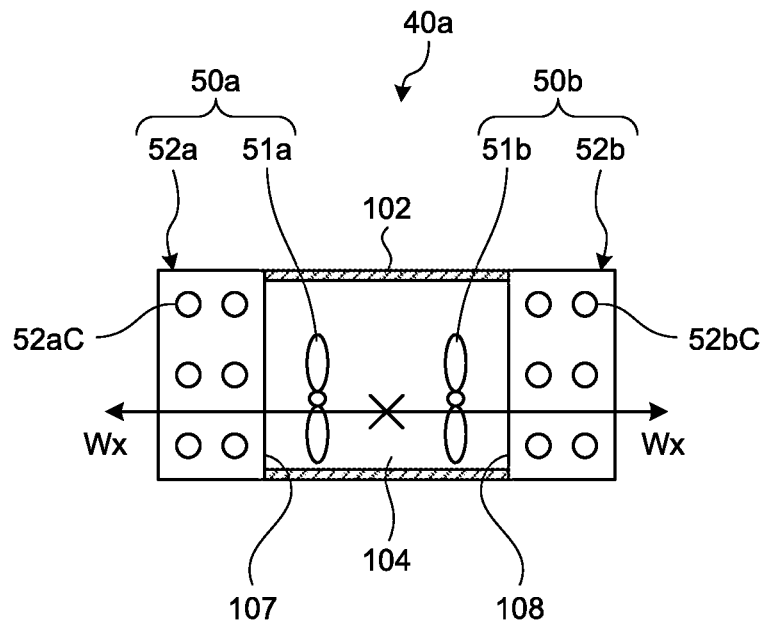
FIG. 10 is a cross-sectional view of the intercooler according to the second embodiment, taken along the line A-A.
Figure 11:
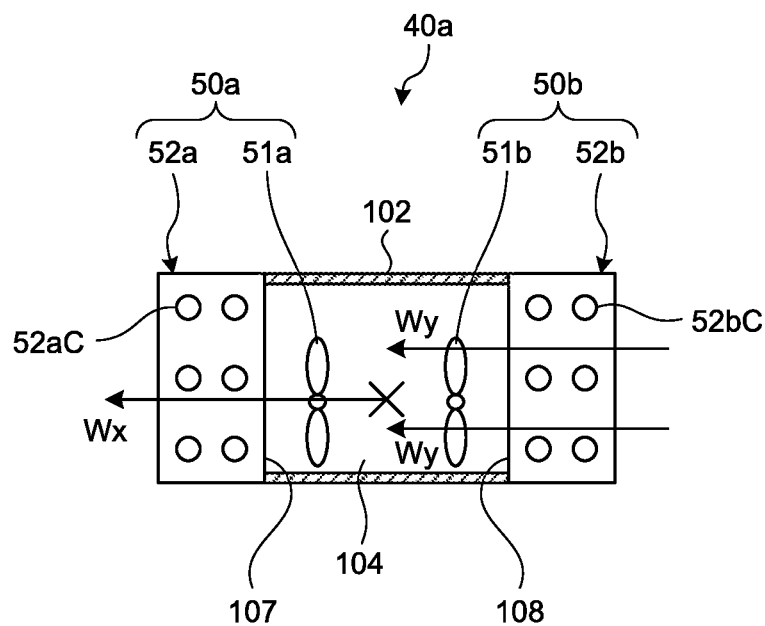
FIG. 11 is a cross-sectional view of the intercooler according to the second embodiment, taken along the line A-A.

A second embodiment of the present invention will be described next according to the drawings. FIG. 8 is a schematic diagram showing an exemplary intercooler 40a according to the second embodiment. FIG. 9 is a front view showing the exemplary intercooler 40a according to the second embodiment. FIG. 10 is a cross-sectional view of the intercooler 40a according to the second embodiment, taken along the line A-A. FIG. 11 is a cross-sectional view of the intercooler 40a according to the second embodiment, taken along the line A-A. The intercooler 40a according to the second embodiment is different from the intercooler 40 according to the first embodiment in that the intercooler 40a includes a plurality of air cooler 50a and 50b and a space 104 on the upstream sides according to airflows with respect to fans 51a and 51b. Because other aspects of the structure are the same as those of the first embodiment, descriptions thereof will be omitted.

As shown in FIG. 8, the intercooler 40a according to the second embodiment includes a first air cooler 50a, a second air cooler 50b, and a cover 102 having a space 104 internally. The first air cooler 50a and the second air cooler 50b have the same structure as that of the air cooler 50 according to the first embodiment. The cover 102 is, for example, a frame member. As shown in FIG. 10, the cover 102 is connected to the first air cooler 50a at one end 107 and is connected to the second air cooler 50b at another end 108. In other words, the intercooler 40a is manufactured such that the first air cooler 50a and the second air cooler 50b are adjacent to each other via the cover 102. An air inlet 106 is formed on a side surface of the cover 102.

As shown in FIG. 10, the fan 51a of the first air cooler 50a and the fan 51b of the second air cooler 50b are housed in the space 104 in the cover 102. The fan 51a causes an airflow Wx toward a heat exchanger 52a of the first air cooler 50a and the fan 51b causes an airflow Wx toward a heat exchanger 52b of the second air cooler 50b. The area on the side where the air from the fan 51a is taken and on the upstream side according to the airflow Wx with respect to the fan 51a is the space 104. Similarly, the area on the side where the air from the fan 51b is taken and on the upstream side according to the airflow Wx with respect to the fan 51b is the space 104. In other words, the fans 51a and 51b share the area on the upstream sides according to the airflows Wx and the spaces on the upstream sides according to the airflows Wx with respect to the fans 51a and 51b communicate with each other. Furthermore, according to the second embodiment, the heat exchanger 52a and 52b are respectively positioned on downstream sides according to the airflows Wx with respect to the fans 51a and 51b. A cooling method taken by the intercooler 40a will be described next.

The fans 51a and 51b are driven by, for example, the controller 41. FIG. 10 shows the case where both of the fan 51a and the fan 51b are driven. As shown in FIG. 10, when both of the fans 51a and 51b are driven, the fan 51a causes an airflow Wx from the air inlet 106 toward the heat exchanger 52a. Similarly, the fan 51b causes an airflow Wx from the air inlet 106 toward the heat exchanger 52b. The airflows Wx passes through heat transfer pipes 52aC and heat transfer pipes 52bC to cool the cooling water in the heat transfer pipes 52aC and the cooling water in the heat transfer pipes 52bC and flow out to the outside of the intercooler 40a. The case where only the fan 51a is driven will be described next.

FIG. 11 shows the case where only the fan 51a is driven. As shown in FIG. 11, when only the fan 51a is driven, the fan 51a causes an airflow Wx from the air inlet 106 toward the heat exchanger 52a to cool the cooling water in the heat exchanger 52a. Because the fan 51b is not driven, the fan 51b does not cause any airflow from the air inlet 106 toward the heat exchanger 52b. However, the area on the upstream side according to the airflow with respect to the fan 51b and the area on the upstream side according to airflow with respect to the fan 51a share the space 104. Accordingly, the fan 51a causes an airflow Wy from the heat exchanger 52b toward the fan 51a. The airflow Wy passes between the heat transfer pipes 52bC from the outside of the intercooler 40a and merges with the airflow Wx. The airflow Wy passes between the heat transfer pipes 52bC, thereby cooling the cooling water in the heat transfer pipes 52bC.

As described above, in the intercooler 40a according to the second embedment, the areas on the upstream sides with respect to the fans 51a and 51b communicate with each other in the space 104. Accordingly, only driving one of the fans makes it possible to generate airflows toward both of the heat exchangers 52a and 52b to cool the cooling water in the heat exchangers 52a and 52b. For example, when the controller 41 is driven by using an emergency power supply in an emergency, it is desirable to reduce the power usage of emergency power supply as much as possible. In this case, the intercooler 40a according to the second embodiment makes it possible to cool the cooling water in a plurality of heat exchangers by driving only one of the fans to reduce power usage. Accordingly, the intercooler 40a according to the second embodiment makes it possible to inhibit the heat exchange performance from lowering while reducing the power usage. The intercooler 40a according to the second embodiment includes a plurality of air coolers. Accordingly, when maintenance is required for an air cooler, part of the air coolers can be detached from the intercooler 40a for maintenance. Accordingly, for maintenance of an air cooler, because the intercooler 40a is capable of cooling the cooling water depending on another air cooler, the cooling function is not lost. According to the second embodiment, the intercooler 40a includes two air coolers. Alternatively, the air intercooler 40a may include three or more air coolers.

Figure 12:
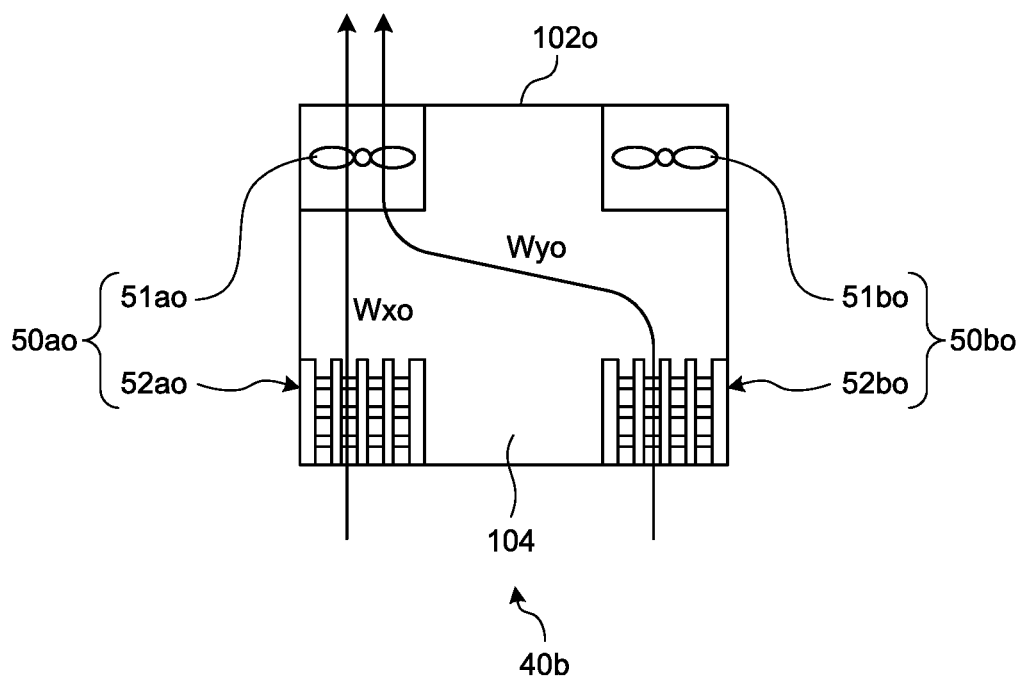
FIG. 12 is a schematic diagram showing another exemplary intercooler according to the second embodiment.

FIG. 12 is a schematic diagram showing another exemplary intercooler according to the second embodiment. The intercooler 40a is not limited to the setting layout represented according to the second embodiment. According to the second embodiment, the heat exchangers 52a and 52b are positioned on the downstream sides according to the airflow Wx with respect to the respective fans 51a and 51b; however, the positions are not limited to this. For example, as shown in FIG. 12, an intercooler 40b may be one in which heat exchangers are positioned on the upstream side according to airflow with respect to fans and suction fans are used for the fans. As shown in FIG. 12, a fan 51ao of a first air cooler 50ao and a fan 51bo of a second air cooler 50bo are suction fans. The fan 51ao causes an airflow Wxo from a heat exchanger 52ao toward the outside of a cover 102o. When the fan 51bo is not driven and only the fan 51ao is driven, the fan 51ao causes an airflow Wyo in addition to the airflow Wxo. The airflow Wyo is an airflow from a heat exchanger 52bo of the second air cooler 50bo toward the fan 51ao and the airflow Wyo cools the cooling water in the heat exchanger 52bo. In the case shown in FIG. 12, because the heat exchangers 52ao and 52bo are cooled by the external air, the cooling water can be cooled more efficiently. As described above, in the intercooler 40a, when a plurality of air coolers 50 according to the first embodiment are set adjacently and the spaces on the upstream sides with respect to the fans 51 communicate with each other, it is possible to inhibit the heat exchange performance from lowering while reducing the power usage.

Third Embodiment

Figure 13:
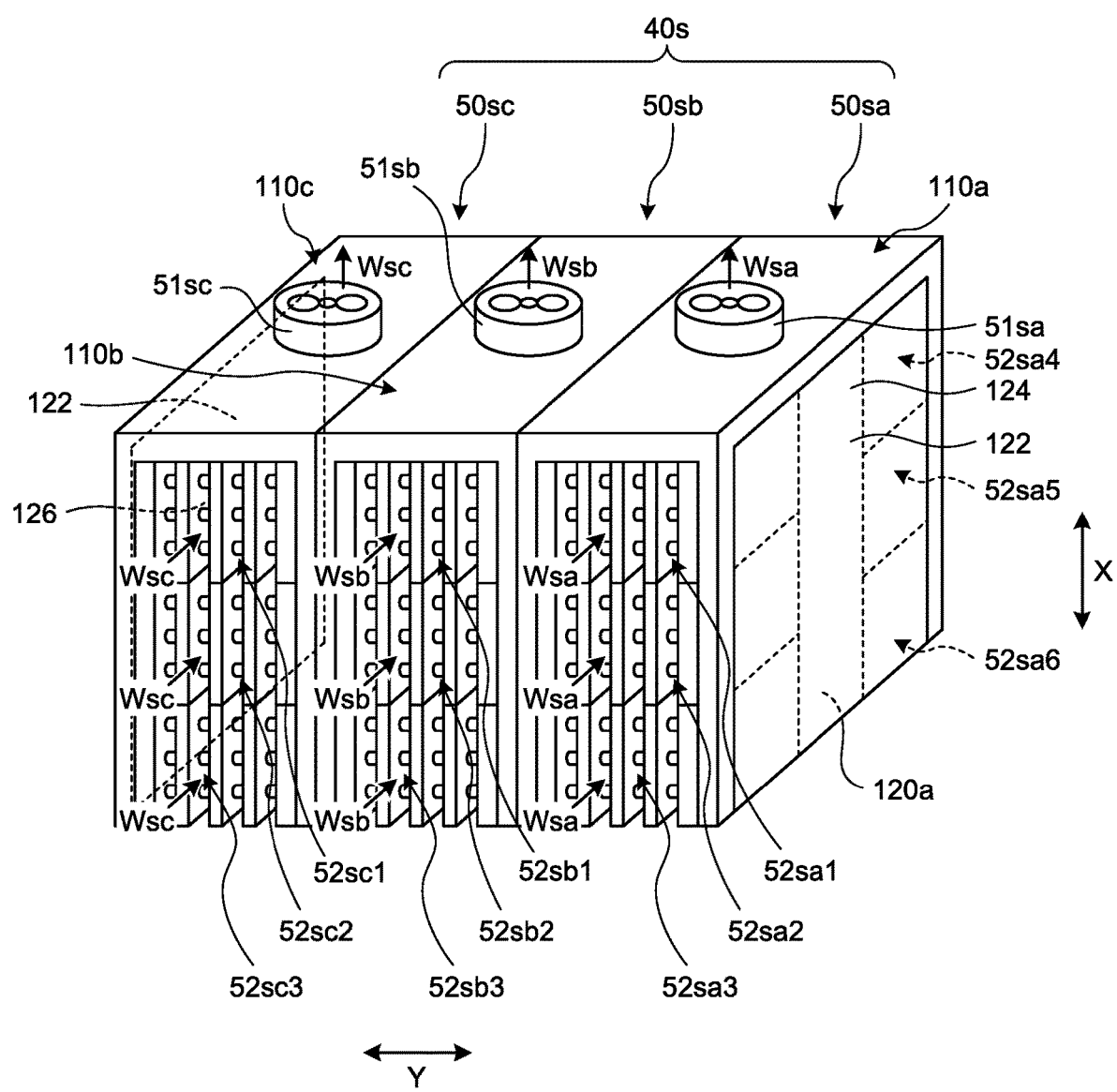
FIG. 13 is a perspective view showing an intercooler according to a third embodiment.

A third embodiment of the present invention will be described next with reference to the drawings. FIG. 13 is a perspective view showing an intercooler 40s according to the third embodiment. The intercooler 40s according to the third embodiment is different from the second embodiment in that a plurality of air coolers each including a fan and a plurality of heat exchangers are disposed adjacently. Descriptions will be omitted for components of the intercooler 40s according to the third embodiment having the same structures as those of the second embodiment.

As shown in FIG. 13, the intercooler 40s according to the third embodiment includes a first air cooler 50sa, a second air cooler 50sb, and a third air cooler 50sc. Although specifically described below, the first air cooler 50sa, the second air cooler 50sb, and the third air cooler 50sc are disposed adjacently in the intercooler 40s according to the third embodiment.

Figure 14:
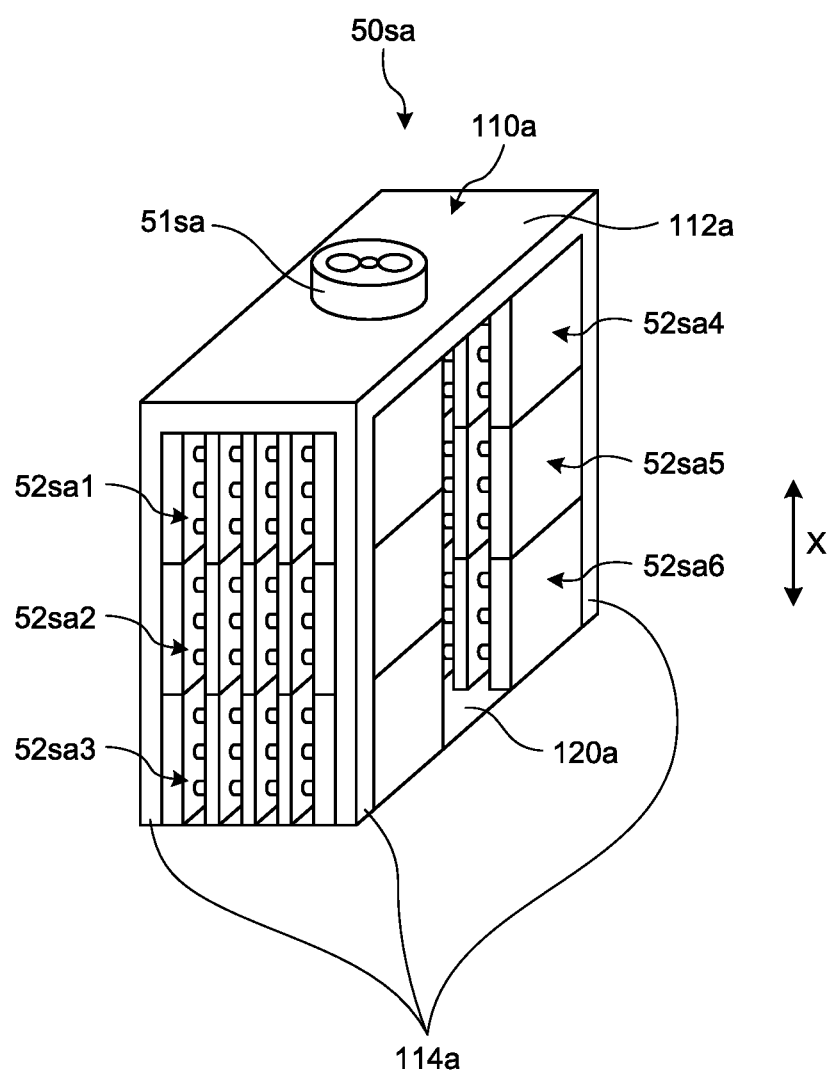
FIG. 14 is a perspective view of an air cooler according to the third embodiment.

FIG. 14 is a perspective view of the first air cooler 50sa according to the third embodiment. As shown in FIG. 14, the first air cooler 50sa includes a cover 110a, heat exchangers 52sa1, 52sa2, 52sa3, 52sa4, 52sa5, 52sa6 and a fan 51sa (hereinafter, the heat exchangers 52sa1 to 52sa6 will be described as heat exchangers 52sa when they are not required to be distinguished from one another).

The cover 110a includes a rectangular plate 112a and legs 114a that extend from the respective corners of the plate 112a in a direction intersecting with the plane parallel to the plate 112a. Although specifically described below, the heat exchangers 52sa are inside the cover 110a and are disposed in the space surrounded by the plate 112a and the legs 114a. The fan 51sa is provided to the plate 112a.

The fan 51sa is, for example, an axial fan that axially intakes and discharges an airflow. An axial fan is capable of causing high-pressure airflows and thus cooling the cooling water preferably. The fan 51sa is, however, not limited to axial fan as long as airflows can be caused. The fan 51sa is driven by, for example, the controller 41.

Figure 15:
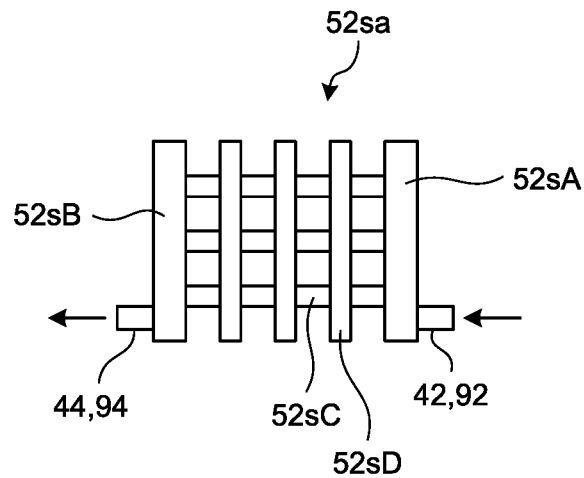
FIG. 15 is a front view of a heat exchanger according to the third embodiment.

FIG. 15 is a front view of the heat exchanger 52sa according to the third embodiment. As shown in FIG. 15, the heat exchanger 52sa includes a first header 52sA, a second header 52sB, a plurality of heat transfer pipes 52sC, and a plurality of plate-shaped fin 52sD. The first header 52sA is a container serving as a water chamber (header) that stores the cooling water (the primary cooling water or the secondary cooling water) and the first header 52sA is connected to the flow-in piping 42 (92) to supply the cooling water flowing through the flow-in piping 42 (92). The second header 52sB is a container serving as a water chamber (header) for storing the cooling water and the second header 52sB is connected to the flow-out piping 44 (94) to discharge the stored cooling water to the flow-out piping 44 (94).

The heat transfer pipe 52sC is provided to extend between the first header 52sA and the second header 52sB, and the ends of the heat transfer pipe 52sC are connected respectively to the first header 52sA and the second header 52sB. A plurality of heat transfer pipes 52sC are disposed in parallel. In other words, the cooling water (medium) that is supplied to the first header 52sA is distributed from the first header 52sA and flows into each of the heat transfer pipes 52sC and the heat transfer pipes 52sC collectively send the cooling water to the second header 52sB.

The plate-shaped fin 52sD is formed to be like a thin plate and is provided orthogonally to the direction in which each of the heat transfer pipes 52C extends, so that each of the heat transfer pipes 52sC penetrates through the plate-shaped fins 52sD. A plurality of plate-shaped fins 52 are disposed at intervals along the direction in which each of the heat transfer pipes 52C extends. The plate-shaped fins 52sD are used as plates for rectifying the airflows flowing between the heat transfer pipes 52sC. The heat exchanger 52sa does not necessarily include the plate-shaped fins 52sD.

The heat exchanger 52sa causes heat exchange between the cooling water flowing in from the flow-in piping 42 (92) and the airflow that is guided by the fan 51sa and pass between the heat transfer pipes 52sC, thereby cooling the cooling water. There is no limitation on the number of heat transfer pipes 52sC as long as multiple heat transfer pipes are used. There is no limitation also on the number of plate-shaped fins 52sD.

Figure 16:
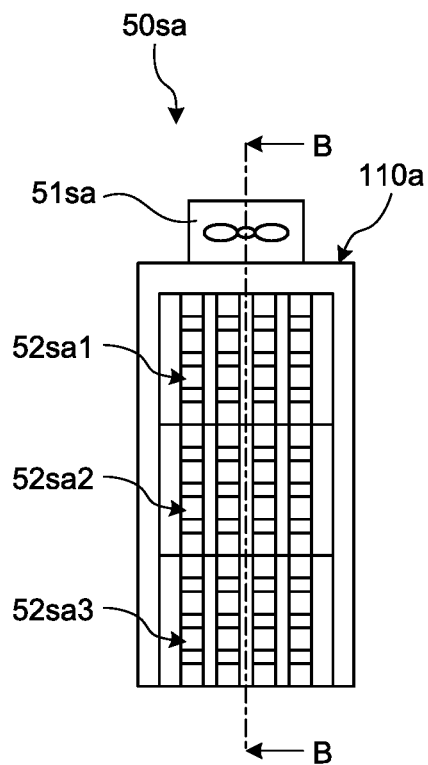
FIG. 16 is a front view of the air cooler according to the third embodiment.
Figure 17:
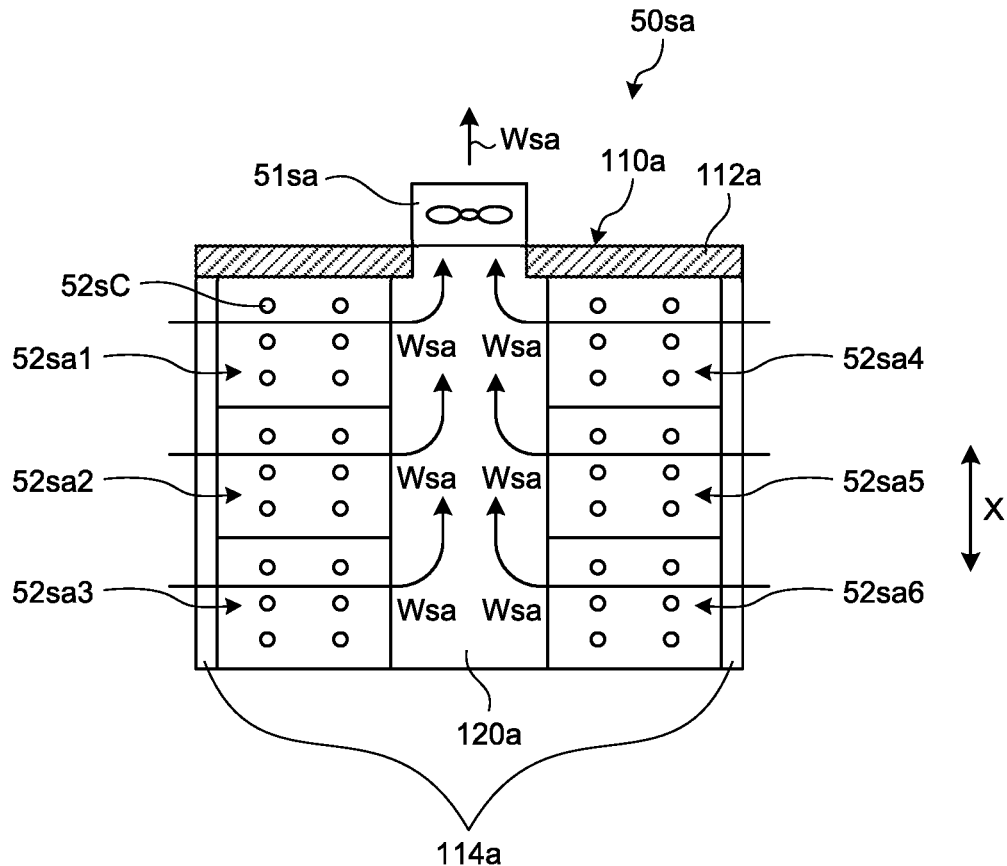
FIG. 17 is a cross-sectional view of the air cooler according to the third embodiment, taken along the line B-B.

FIG. 16 is a front view of the first air cooler 50sa according to the third embodiment. FIG. 17 is a cross-sectional view of the first air cooler 50sa according to the third embodiment, taken along the line B-B. As shown in FIGS. 14 and 17, the heat exchangers 52sa1, 52sa2 and 52sa3 are set by being stacked downward in a vertical direction X inside the cover 110a according to the order they appear in this sentence. The heat exchangers 52sa4, 52sa5 and 52sa6 are set by being stacked downward in the vertical direction X inside the cover 110a according to the order they appear in this sentence. The heat exchangers 52sa1, 52sa2 and 52sa3 and the heat exchangers 52sa4, 52sa5 and 52sa6 are disposed to be opposed to each other in the direction of the airflow passing between the heat transfer pipes 52sC. As shown in FIGS. 14 and 17, the air cooler 50sa has a space 120a between the heat exchangers 52sa1, 52sa2 and 52sa3 and the heat exchangers 52sa4, 52sa5 and 52sa6.

As shown in FIG. 17, the fan 51sa takes in the air in the space 12a inside the cover 110a and discharges the air to the outside of the air cooler 50sa. Accordingly, the fan 51sa causes airflows Wsa each circulating between the heat transfer pipes 52sC of each of the heat exchangers 52sa to the space 120a. The airflows Wsa pass between the heat transfer pipes 52sC and thus cool the cooling water in each heat exchanger 52sa. The airflows Wsa flowing between the heat transfer pipes 52sC merge in the space 120a and flow out of the air coolers 50sa via the fan 51sa. In other words, the space 120a is on the side where the fan 51sa takes air in and is positioned on the upstream side according to the airflows Wsa with respect to the fan 51sa. The heat exchangers 52a are positioned on the upstream side according to the airflows Wsa with respect to the space 120a.

As described above, the first air cooler 50sa includes the heat exchanger 52sa, the fan 51sa that circulates the airflows Wsa between the heat transfer pipes 52sC and the space 120a in which the airflows Wsa circulate on the upstream side according to the airflows Wsa with respect to the fan 51sa. Because the second air cooler 50sb and the third air cooler 50sc have the same configuration as that of the first air cooler 50sa, descriptions thereof will be omitted. The whole structure of the intercooler 40s according to the third embodiment will be described next.

Figure 18:
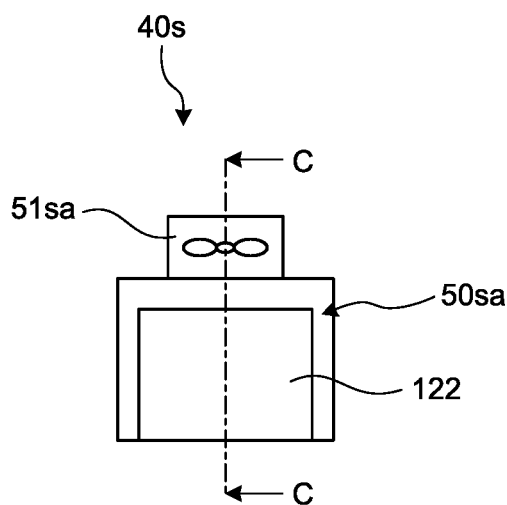
FIG. 18 is a side view of the intercooler according to the third embodiment.
Figure 19:
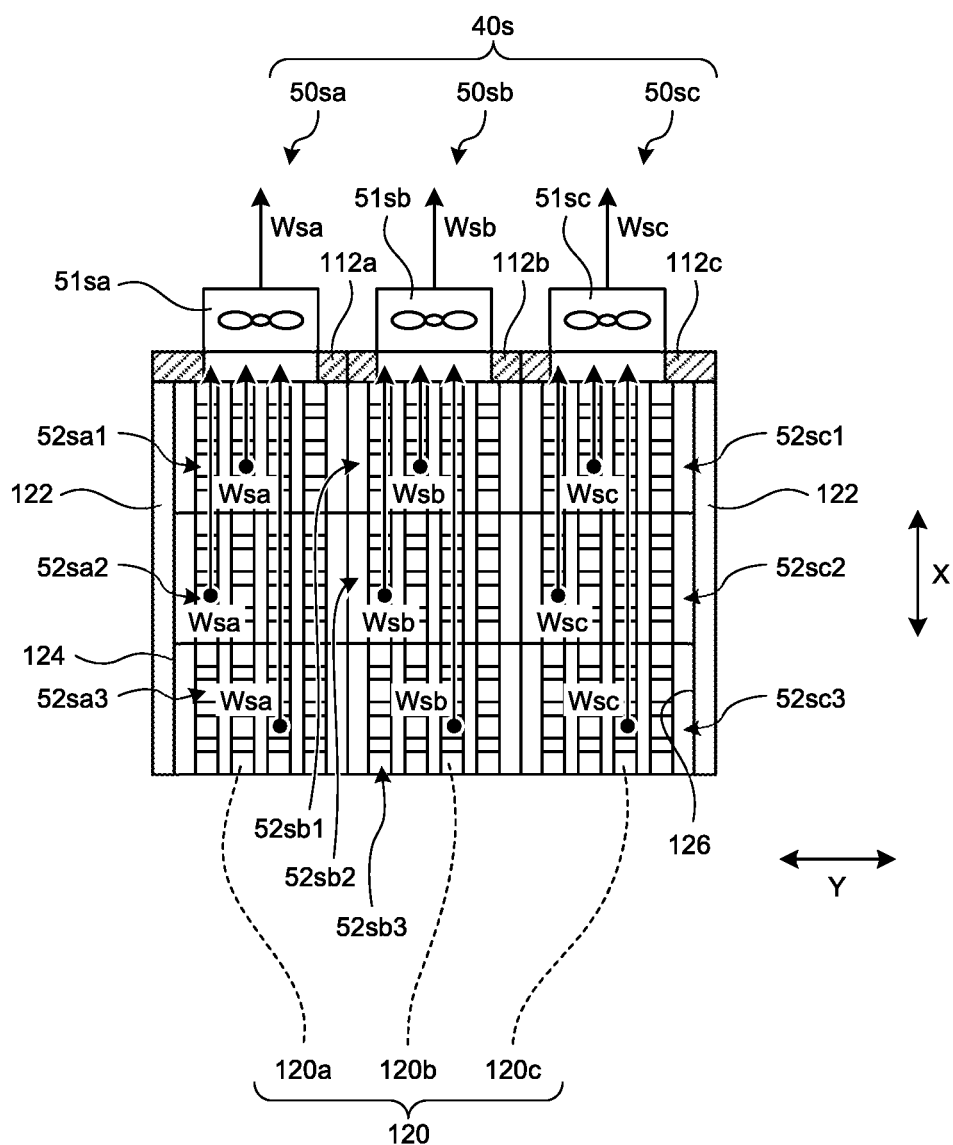
FIG. 19 is a cross-sectional view of the intercooler according to the third embodiment, taken along the line C-C.
Figure 20:
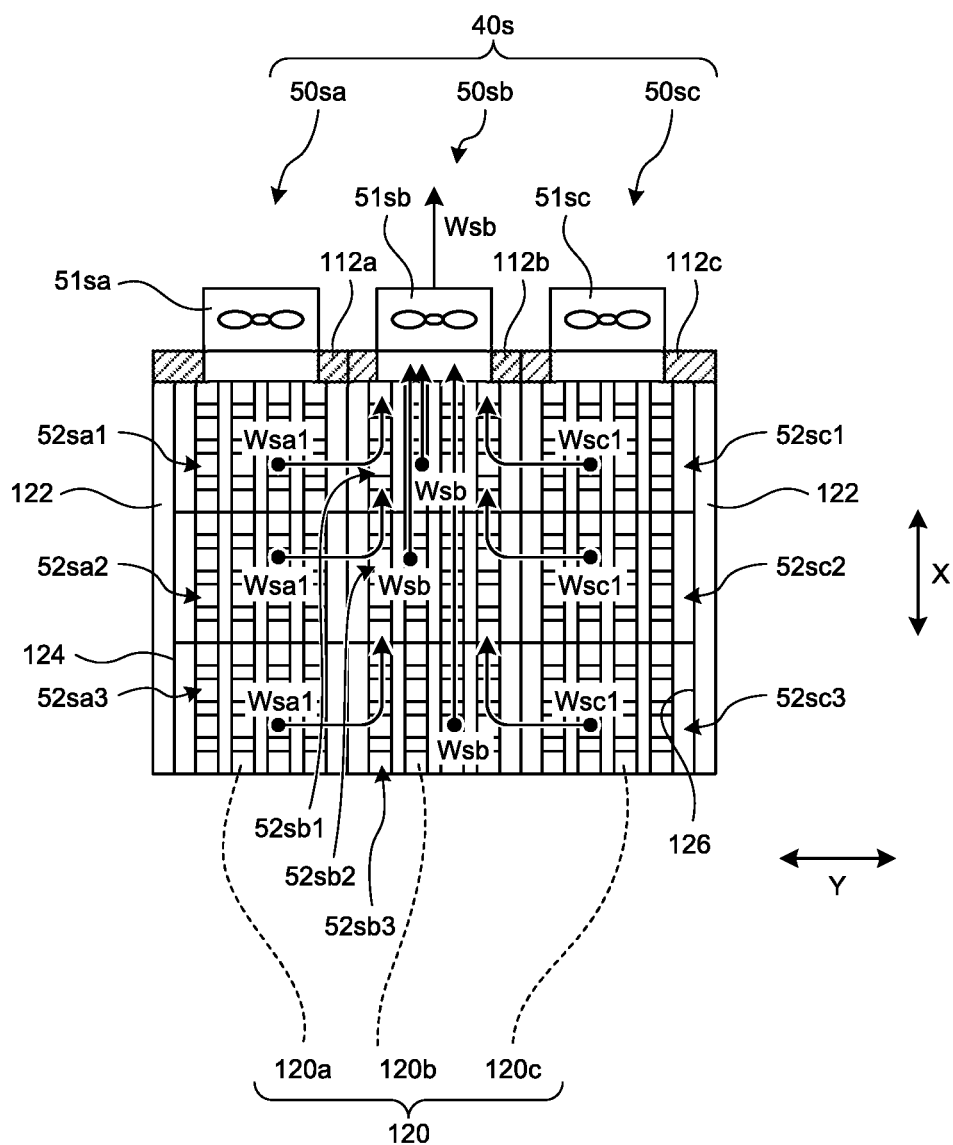
FIG. 20 is a cross-sectional view of the intercooler according to the third embodiment, taken along the line C-C.

FIG. 18 is a side view of the intercooler 40s according to the third embodiment. FIG. 19 is a cross-sectional view of the intercooler 40s according to the third embodiment, taken along the line C-C. FIG. 20 is a cross-sectional view of the intercooler 40s according to the third embodiment, taken along the line C-C. As shown in FIGS. 13 and 18, in the intercooler 40s according to the third embodiment, the first air cooler 50sa, the second air cooler 50sb, and the third air cooler 50sc are set adjacently according to the order they appear in this sentence in the horizontal direction Y serving as the horizontal direction with respect to the vertical direction X. The Y direction is the direction intersecting with the direction in which the heat exchangers 52sa1, 52sa2 and 52sa3 are opposed to the heat exchangers 52sa4, 52sa5 and 52sa6.

On a side surface 124 of the first air cooler 50sa that is opposed to the side surface adjacent to the second air cooler 50sb, a wall 122 that partitions the space 120a and the outside of the intercooler 40s is provided. Similarly, on a side surface 126 of the third air cooler 50sc that is opposed to the side surface adjacent to the second air cooler 50sb, the wall 122 that partitions space 120c in the third air cooler 50sc and the outside of the intercooler 40s is provided. As shown in FIG. 19, the space 120a of the first air cooler 50sa, space 120b of the second air cooler 50sb, and the space 120c of the third air cooler 50sc communicate with one another, thereby forming space 120. A cooling method performed by the intercooler 40s will be described next.

FIGS. 13 and 19 show the case where the fans 51sa, 51sb and 51sc are driven. The fan 51sa causes airflows Wsa from the respective heat exchangers 52sa (only the heat exchangers 52sa1, 52sa2 and 52sa3 are shown in FIG. 19) toward the fan 51sa via the space 120a. The airflows Wsa flows out toward the outside of the intercooler 40s from the fan 51sa. Similarly, the fan 51sb causes airflows Wsb from the respective heat exchangers 52sb (only the heat exchangers 52sb1, 52sb2 and 52sb3 are shown in FIG. 19) toward the fan 51sb via the space 120b. The airflows Wsb flow out toward the outside of the intercooler 40s from the fan 51sb. Similarly, the fan 51sc causes airflows Wsc from the respective heat exchangers 52sc (only the heat exchangers 52sc1, 52sc2 and 52sc3 are shown in FIG. 19) toward the fan 51sc via the space 120c. The airflows Wsc flow out toward the outside of the intercooler 40s from the fan 51sc. In this manner, the airflows Wsa, Wsb and Wsc cool the cooling water in the respective heat exchangers 52sa, 52sb and 52sc. The case where only the fan 51sb is driven will be described next.

FIG. 20 shows the case where only the fan 51sb is driven. As shown in FIG. 20, when only the fan 51sb is driven, the fan 51sb causes the airflows Wsb from the heat exchangers 52sb toward the space 120b to cool the cooling water in the heat exchangers 52sb. Because the fans 51sa and 51sc are not driven, they do not cause the airflows Wsa and Wsc, respectively.

The space 120b on the upstream side according to the airflows with respect to the fan 51sb, the space 120a on the upstream side according to the airflows with respect to the fan 51a, and the space 120c on the upstream side according to the airflows with respect to the fan 51sc communicate with one another as the space 120. Accordingly, the fan 51sb causes airflows Wsa1 from the heat exchanger 52sa toward the fan 51sb. The airflows Wsa1 pass through the heat exchangers 52sa to cool the cooling water in the heat exchangers 52sa and merge with the airflows Wsb. Similarly, the fan 51sb causes airflows Wsc1 from the heat exchangers 52sc toward the fan 51sb. The airflows Wsc1 pass through the heat exchangers 52sc to cool the cooling water in the heat exchangers 52sc and merge with the airflows Wsb.

In the intercooler 40s according to the third embodiment, the spaces 120a, 120b and 120c on the upstream side according to the airflows with respect to the fans 51sa, 51sb and 51sc communicate with one another as the space 120. Accordingly, as described above, only driving, for example, the fan 51sb causes airflows toward all the heat exchangers of the air coolers 50sa, 50sb and 50sc to cool the cooling water in all the heat exchangers. For example, when the controller 41 is driven by using an emergency power supply in an emergency, it is desirable to reduce the power usage of the emergency power supply as much as possible. In this case, the intercooler 40s according to the third embodiment makes it possible to cool the cooling water in the heat exchangers by drying only one of the fans to reduce power usage. Accordingly, the intercooler 40s according to the third embodiment makes it possible to inhibit the heat exchange performance from lowering while reducing the power usage. According to the above descriptions, the fan 51sb of the center air cooler 50sb among the adjacent air coolers is driven; however, the fan is not limited to this. For example, driving only the fan 51sa of the air cooler 50sa, or the fan 51sc of the air cooler 50sc, at one end similarly makes it possible to cool the cooling water in the heat exchangers of all the air coolers.

The intercooler 40s according to the third embodiment includes the air coolers. Accordingly, when maintenance is required for an air cooler, part of the air coolers can be detached from the intercooler 40s for maintenance. Accordingly, for maintenance of an air cooler, because the intercooler 40s is capable of cooling the cooling water depending on another air cooler, the cooling function is not lost.

In the intercooler 40s according to the third embodiment, the first air cooler 50sa, the second air cooler 50sb, and the third air cooler 50sc are set adjacently in the Y direction; however, the setting is not limited to this. The intercooler 40s may include, for example, two air coolers or four or more air coolers. As long as the spaces on the upstream side with respect to the fans of the respective air coolers communicate with one another, it is possible to select a layout for setting the air coolers as appropriate.

The heat exchangers according to the third embodiment are positioned on the upstream side according to airflows with respect to the fans and on a further upstream side according to the airflows with respect to the space 120 on the upstream side according to the airflows with respect to the fans. Accordingly, the cooling water in the heat exchangers is cooled by the external air. For this reason, the intercooler 40s according to the third embodiment is capable of cooling the cooling water in the heat exchangers efficiently, which makes it possible to inhibit the heat exchange performance from lowering. Note that, for example, as represented in the second embodiment, the heat exchangers may be positioned on a further downstream side according to the airflows with respect to the fans.

Each of the air coolers 50sa according to the third embodiment includes six heat exchangers. Because an air cooler includes a plurality of heat exchangers, it is possible to efficiently cool the cooling water, thereby inhibiting the heat exchange performance from lowering. However, the number of heat exchangers of an air cooler is not limited to this. An air cooler may include a plurality of heat exchangers or a single exchanger.

Furthermore, in the first air cooler 50sa according to the third embodiment, the heat exchangers 52sa1, 52sa2 and 52sa3 and the heat exchangers 52sa4, 52sa5 and 52sa6 are disposed to be opposed to each other in the direction in which the airflows Wsa flow between the heat transfer pipes 52sC; however the disposition is not limited to this. For example, part of the heat exchangers, such as the heat exchanger 52sa1 and the heat exchanger 52sa4, may be disposed to be opposed to each other. Disposing part of the heat exchangers to be opposed to each other toward the direction in which the airflows Wsa circulate between the heat transfer pipes 52sC allows efficient circulation of the airflows Wsa. Note that the heat exchangers are not necessarily opposed to each other and a layout of arraying heat exchangers can be selected as appropriate. Furthermore, the shape of the cover 110a may be selected as appropriate according to the arraying of the heat exchangers.

Instead of the heat exchangers 52sa, 52sb and 52sc according to the third embodiment, the heat exchanger 52 according to the first embodiment may be used. Using the heat exchanger 52 according to the first embodiment for the intercooler 40s according to the third embodiment makes it possible to inhibit the heat exchange performance from lowering more preferably.

(Modification)

Figure 21:
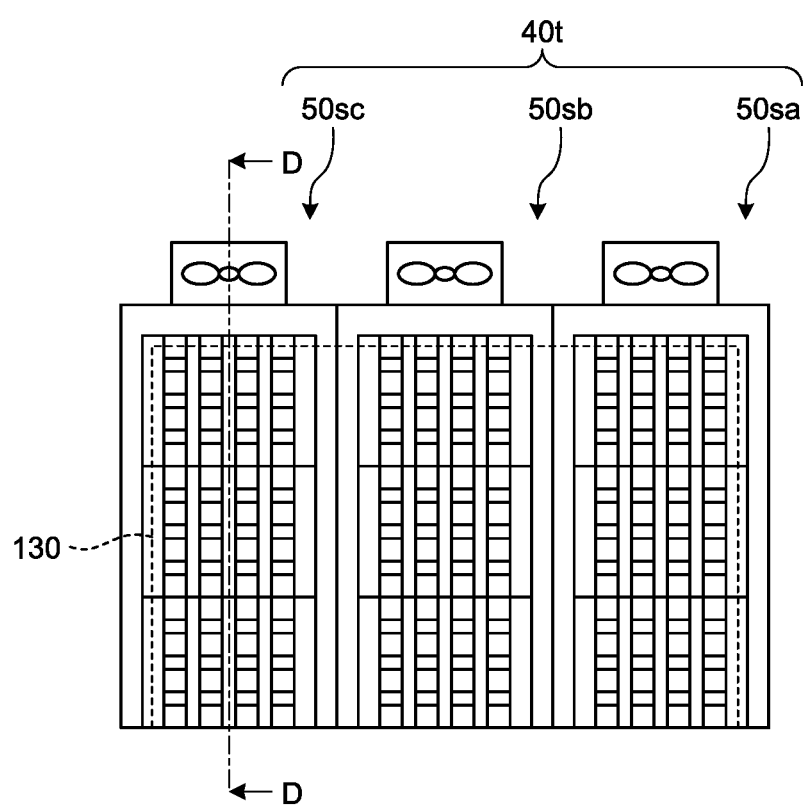
FIG. 21 is a front view of an intercooler according to a modification.
Figure 22:
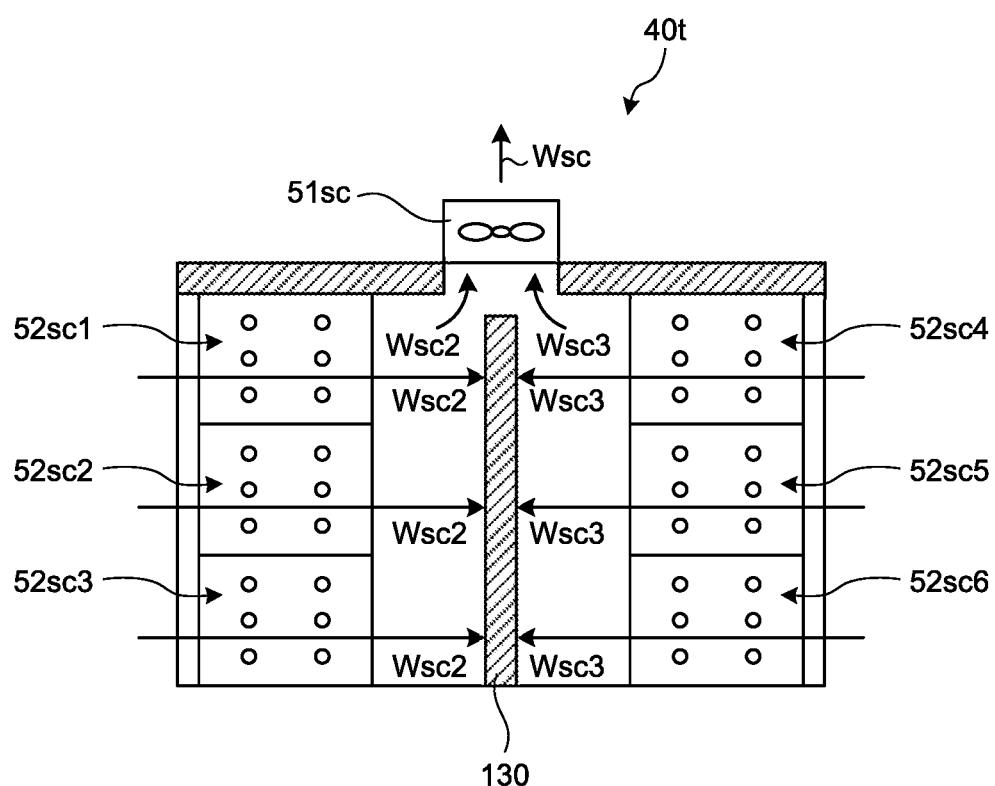
FIG. 22 is a cross-sectional view of the air cooler according to the modification, taken along the line D-D.

A modification of the intercooler according to the third embodiment will be described next according to the drawings. FIG. 21 is a front view of an intercooler 40t according to the modification. FIG. 22 is a cross-sectional view of the intercooler 40t according to the modification, taken along the line D-D. The intercooler 40t according to the modification is different from the intercooler 40s according to the third embodiment in that the intercooler 40t includes a partition 130. Because other aspects of the structure of the intercooler 40t according to the modification are the same as those of the third embodiment, descriptions thereof will be omitted.

As shown in FIGS. 21 and 22, the intercooler 40t includes the partition 130. The partition 130 is provided between heat exchangers opposed to each other in the first air cooler 50sa, the second air cooler 50sb and the third air cooler 50sc. For example, when a strong wind occurs due to, for example, a typhoon, the airflows flowing in from the outside toward the heat exchangers 52sc1, 52sc2 and 52sc3 may directly flow toward the opposed heat exchangers 52sc4, 52sc5 and 52sc6 and flow out to the outside. In this case, the airflows having passed through the heat exchangers 52sc1, 52sc2 and 52sc3 and having been subjected to heat exchange circulate to the heat exchangers 52sc4, 52sc5 and 52sc6. The airflows inhibit the flow of the airflows from the outside toward the heat exchangers 52sc4, 52sc5 and 52sc6. When the partition 130 is provided, as shown in FIG. 22, the partition 130 inhibits airflows Wsc2 flowing in toward the heat exchangers 52sc1, 52sc2 and 52sc3 from flowing toward the opposed heat exchangers 52sc4, 52sc5 and 52sc6. Accordingly, the intercooler 40t according to the modification makes it possible to inhibit the airflows Wsc2 after being subjected to heat exchange from flowing into the heat exchangers 52sc4, 52sc5 and 52sc6. The intercooler 40t according to the modification does not inhibit the flow of airflows Wsc3 from the outside toward the heat exchangers 52sc4, 52sc5 and 52sc6. Accordingly, the intercooler 40t according to the modification is capable of cooling the cooling water in the heat exchangers more preferably, which makes it possible to inhibit the heat exchange performance from lowering.

The first, second and third embodiments and the modification have been described. In the first, second and third embodiments and the modification, the intercooler according to the present invention cools the primary cooling water or the secondary cooling water; however, what is cooled is not limited to this and other various types of equipment may be cooled. For example, the intercooler according to the present invention serves as an alternative means for cooling the cooling water in the cooling piping 27 in the condenser 23 and is able to cool the steam flowing from the turbine 22. Furthermore, for example, the intercooler according to the present invention is able to cool the cooling water in a spent fuel pool. The intercooler according to the present invention may be used as a heat pipe that cools the steam in the steam generator 7 to liquid.

The controller 41 that controls the intercooler according to the present invention may be driven by an emergency power supply. For the emergency power supply of the controller 41, such as a power generating device depending on natural energy, such as a wind power generator and a battery, a solar power generator and a battery, or a tidal power generator and a battery. Using a power generating device depending on natural energy as the emergency power supply inhibits a power shortage in an emergency, which makes it possible to inhibit the cooling water from not being cooled. For the emergency power supply, only a power generating device depending on natural energy may be used or, for a backup of an emergency power facility, a power generating device depending on natural energy may be additionally used.

The first, second and third embodiments and the modification have been described; however, what is described according to the embodiments are not to be construed to limit the embodiments. The foregoing components include ones easily conceived by those skilled in the art and ones substantially the same, i.e., in the range of equivalency. Furthermore, the foregoing components may be combined as appropriate. Furthermore, various components can be omitted, replaced or changed within the scope of the forgoing embodiments, etc.

REFERENCE SIGNS LIST

1 NUCLEAR FACILITY
4 SECONDARY COOLING SYSTEM
40 INTERCOOLER
42 FLOW-IN PIPING (CIRCULATION PIPING)
44 FLOW-OUT PIPING (CIRCULATION PIPING)
50 AIR COOLER
51 FAN
52 HEAT EXCHANGER
52A FIRST HEADER (HEADER)
52Aa, 52Ab, 52Ab, 52Ad FIRST DIVISION HEADER
52A SECOND HEADER (HEADER)
52Ba, 52Bb, 52Bb, 52Bd SECOND DIVISION HEADER
52C HEAT TRANSFER PIPE
52D PLATE-SHAPED FIN
52Da BLOCK
52Daa SMALL BLOCK
52Db DIVISION END
52E PARTITION
52F CONNECTION PIPE
90 INTERCOOLER
92 FLOW-IN PIPING (CIRCULATION PIPING)
94 FLOW-OUT PIPING (CIRCULATION PIPING)
W CIRCULATION DIRECTION

The invention claimed is:

1. An intercooler comprising:
a circulation piping for circulating cooling water for heat exchange using heat generated by a nuclear reactor of a nuclear facility; and
an air cooler that is connected to the circulation piping and that acquires the heat of the cooling water in the circulation piping through heat exchange, the air cooler comprising:
a plurality of heat transfer pipes which are disposed in parallel;
a first header which is fixed to one ends of the heat transfer pipes and a second header which is fixed to other ends of the heat transfer pipes;
a plurality of plate-shaped fins through which each of the heat transfer pipes is penetrated and that are provided at intervals in a direction in which the heat transfer pipes extend between the first header and the second header; and
a fan that circulates an airflow between the plate-shaped fins,
wherein the first header and the second header are sectioned into sectioned areas which are arranged in multiple rows by partitions provided in the first header and the second header, the heat transfer pipes are disposed more densely in the sectioned area of the headers than in an area between the sectioned areas,
when viewed from an extending direction of the heat transfer pipes, the heat transfer pipes adjacent one another are disposed to be positioned at each apex of a triangle, so that the heat transfer pipes are positioned differently between a circulation direction in which the airflow is circulated by the fan and a direction orthogonal to the circulation direction, the heat transfer pipes are disposed to be positioned at each apex of an equilateral triangle in the sectioned area, and the heat transfer pipes are disposed to be positioned at each apex of an isosceles triangle in the area between the sectioned areas.

* * * * *